US012506371B2

(12) United States Patent
Steinert et al.

(10) Patent No.: US 12,506,371 B2
(45) Date of Patent: Dec. 23, 2025

(54) ELECTROMAGNETIC ROTARY DRIVE

(71) Applicant: Levitronix GmbH, Zürich (CH)

(72) Inventors: Daniel Steinert, Bülach (CH);
Emanuel Hubmann, Zürich (CH);
Reto Schöb, Wollerau (CH)

(73) Assignee: Levitronix GmbH, Zürich (CH)

( * ) Notice: Subject to any disclaimer, the term of this patent is extended or adjusted under 35 U.S.C. 154(b) by 217 days.

(21) Appl. No.: 18/389,587

(22) Filed: Nov. 14, 2023

(65) Prior Publication Data
US 2024/0195235 A1 Jun. 13, 2024

(30) Foreign Application Priority Data

Dec. 12, 2022 (EP) ..................... 22212875

(51) Int. Cl.
H02K 1/14 (2006.01)
C12M 1/00 (2006.01)
C12M 1/02 (2006.01)
H02K 1/2733 (2022.01)
H02K 21/16 (2006.01)

(52) U.S. Cl.
CPC ............. H02K 1/148 (2013.01); C12M 23/28 (2013.01); C12M 27/00 (2013.01); H02K 1/2733 (2013.01); H02K 21/16 (2013.01)

(58) Field of Classification Search
CPC ...... H02K 1/148; H02K 1/2733; H02K 21/16; C12M 23/28; C12M 27/00
See application file for complete search history.

(56) References Cited

U.S. PATENT DOCUMENTS

| 6,018,208 A * | 1/2000 | Maher ................. A61M 60/117 |
| | | 417/423.1 |
| 10,707,734 B2 | 7/2020 | Holenstein et al. |
| 2023/0302466 A1 | 9/2023 | Göhmann et al. |

FOREIGN PATENT DOCUMENTS

| DE | 102020121422 A1 | 2/2022 |
| EP | 3232549 A1 | 3/2017 |

OTHER PUBLICATIONS

European Search Report issued May 31, 2023 in corresponding European Application No. 22212875.3.

* cited by examiner

Primary Examiner — Viet P Nguyen
(74) Attorney, Agent, or Firm — Global IP Counselors, LLP

(57) ABSTRACT

An electromagnetic rotary drive includes a single-use device for single use and a reusable device for multiple use. The single-use device includes a rotor housing with a rotor, a connecting tube for a fluid, and a single-use component. The rotor housing has an inlet and an outlet, and the rotor is provided in the rotor housing for rotation about a desired axis of rotation defining an axial direction. The rotor can be magnetically driven without contact, and the connecting tube connects the inlet or the outlet of the rotor housing to the single-use component such that in the operating state the fluid flows through the connecting tube. The reusable device includes a stator, by which the rotor is magnetically driven without contact for rotation about the desired axis of rotation in the operating state.

15 Claims, 12 Drawing Sheets

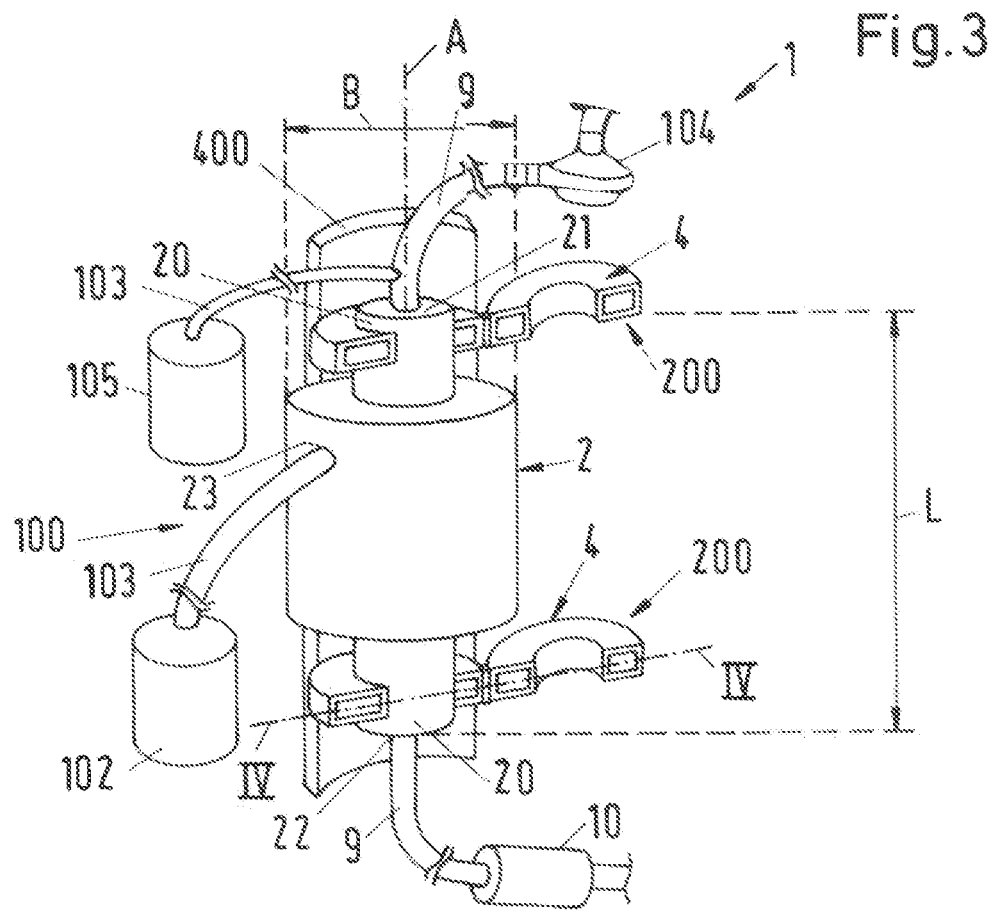
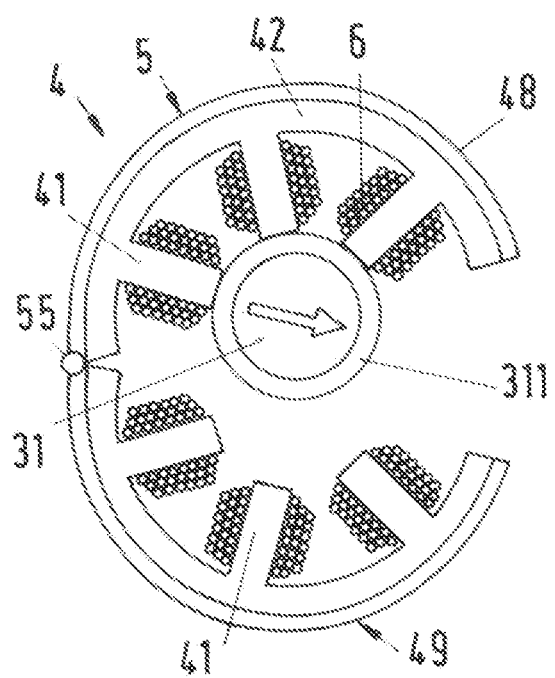
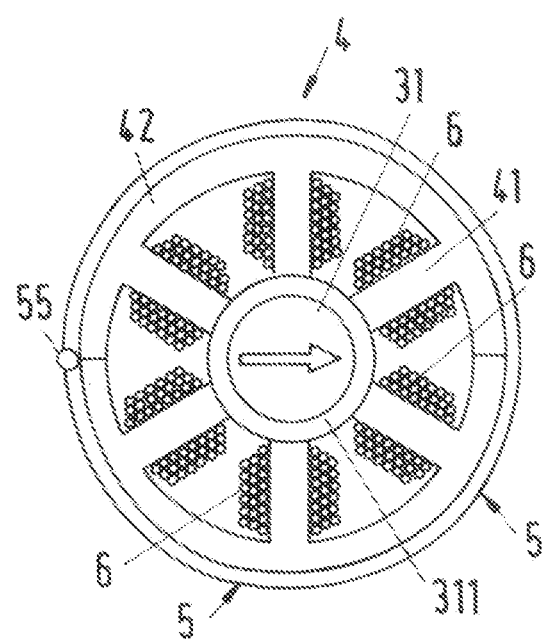

ELECTROMAGNETIC ROTARY DRIVE

CROSS-REFERENCE TO RELATED APPLICATION

This application claims priority to European Application No. 22212875.3, filed Dec. 12, 2022, the contents of which are hereby incorporated by reference.

BACKGROUND

Technical Field

The disclosure relates to an electromagnetic rotary drive. The disclosure further relates to a single-use device for such an electromagnetic rotary drive.

Background Information

In the biotechnology and pharmaceutical industries, electromagnetic rotary drives are frequently used which serve to drive pumps, mixers, separators, filter devices or similar. For example, the pumps serve to convey fluids through a circuit with a bioreactor. For example, a continuous mixing and circulation of the nutrient liquid in a bioreactor is realized with mixers. For example, flowable substances, e.g. suspensions, are divided into two phases of different density in biotechnological processes by separators, which often operate according to the principle of a centrifuge. Filter devices serve, for example, to separate metabolic products of cells from a fluid.

Bioreactors are used to obtain substances, for example proteins, or to cultivate cells or other biological material. Here, bioreactors can be operated both in continuous processes and in batch processes. In these processes, a common method is to remove the fluid, for example a cell broth, from the bioreactor, feed it to a filter device, and return the retentate to the bioreactor. The substance to be extracted is then removed as filtrate or permeate from the filter device and is discharged.

For such processes, electromagnetic rotary drives are required which drive the pumps for conveying the fluids or the separators designed as centrifuges or rotary filter devices or mixing devices.

SUMMARY

In the pharmaceutical industry, in the production of pharmaceutically active substances, very high demands are made on purity, the components which come into contact with the substances often even have to be sterile. Similar demands also result in biotechnology, for example in the production, treatment or cultivation of biological substances, cells, or microorganisms, where an extremely high degree of purity has to be ensured in order not to endanger the usability of the product produced.

Therefore, it has been determined that sterility is of very great importance in such processes where, for example, biological activities take place. Sterilization of the devices, for example by steam sterilization, is very often a time-consuming and cost-intensive factor. For this reason, there is an increasing tendency today to design components of the respective device as single-use parts for such biotechnological processes in order to avoid or reduce to a minimum time-consuming sterilization processes. In particular, those components that come into direct contact with the biological substances during the process are often designed as single-use parts. The term "single use parts" refers to parts or components that can only be used once in accordance with their intended purpose. After use, the single-use parts are disposed of and replaced for the next application by new, i.e., not yet used, single-use parts.

These single-use parts are sterilized before use, for example by being applied with gamma radiation. These single-use parts or single-use devices must then be assembled with other components, for example, a reusable device designed for multiple use. Of course, it is extremely important that the sterility of the single-use parts is maintained when they are assembled with the reusable device. Therefore, efforts are being made to design the single-use devices and the reusable devices in such a way that they can be assembled or separated in the simplest possible manner.

From EP 3 115 103 A1, for example, a mixing device with an impeller is known, which comprises a single-use device and a reusable device, wherein the rotor of the electromagnetic rotary drive, which drives the impeller, is designed as a single-use part, and the stator, with which the rotation of the rotor is driven, is designed as a reusable device.

From DE 10 2020 121 422 a separator is known with which a suspension is divided into two phases of different density by centrifugation. The separator insert with the rotor for centrifuging the suspension is designed as a single-use part and can be inserted into a reusable device which comprises two axially spaced stators with which the rotor can be magnetically levitated without contact and can be driven for rotation without contact. In the assembled state, a stator is provided at each of the two axial ends of the rotor, which encloses a permanent magnet arranged in each case in the rotor. Then, at least one of the stators cooperates with the permanent magnet enclosed by it as an electromagnetic rotary drive, which drives the rotation of the rotor. The other stator is used only for the contactless levitation of the rotor or for both the levitation and the drive of the rotor.

To exchange the separator insert, the two stators are moved away from each other in the axial direction so that the separator insert can be removed and replaced by a new one. Then, the tubes through which the fluids are introduced into or removed from the separator insert must be threaded through a central feedthrough in the respective stator. Subsequently, the two stators are moved towards each other again so that the separator insert is fixed between the two stators with respect to the housing of the device.

It is a disadvantage of such a design that the single-use device cannot be assembled until the tube or tubes is/are threaded through the feedthroughs in the stators, because the tubes are usually connected to other single-use components that usually do not fit through the feedthrough in the stator. This assembly of the single-use components of the single-use device is an additional step which also endangers the sterility of the entire system or requires additional, usually time-consuming measures to ensure sterility or the purity requirements of the process.

Starting from this state of the art, it is therefore an object of the disclosure to propose an electromagnetic rotary drive, which comprises a single-use device for single use and a reusable device for multiple use, wherein the single-use device can be assembled with the reusable device in a particularly simple manner. Furthermore, it is an object of the disclosure to propose a single-use device for such a rotary drive.

The subject matters of the disclosure meeting this object are characterized by the features described herein.

According to the disclosure, an electromagnetic rotary drive is thus proposed with a single-use device designed for single use and with a reusable device designed for multiple use, wherein the single-use device comprises a rotor housing with a rotor, a connecting tube for a fluid, and at least one further single-use component, wherein the rotor housing has an inlet and an outlet, wherein the rotor is provided in the rotor housing for rotation about a desired axis of rotation defining an axial direction, wherein the rotor can be magnetically driven without contact, and wherein the connecting tube connects the inlet or the outlet of the rotor housing to the further single-use component in such a way that in the operating state the fluid can flow through the connecting tube, wherein the reusable device comprises a stator, by which the rotor can be magnetically driven without contact for rotation about the desired axis of rotation in the operating state, wherein the stator comprises a plurality of windings for generating an electromagnetic rotating field for driving the rotor, and wherein the stator has a stator housing with a feedthrough for the connecting tube. The stator is openably designed with a first stator part and a second stator part which can be moved relative to each other, wherein in an open position of the stator the connecting tube can be inserted into the feedthrough, and wherein in a closed position of the stator the feedthrough encloses the connecting tube.

This embodiment with the openable stator has the advantage that the entire already assembled single-use device can be assembled with the reusable device. Thus, the connecting tube can already be connected to the single-use device on the one hand and to the rotor housing on the other hand before the single-use device and the reusable device are assembled. The additional step in known devices of first threading the connecting tube through the feedthrough in the stator housing and only then connecting it to the single-use component and/or to the rotor housing is not necessary in the embodiment according to the disclosure.

To assemble the single-use device with the reusable device, the stator is set to the open position, the connecting tube is inserted into the now laterally open feedthrough, and then the stator is set to the closed position. Now the stator is set to the closed position and the feedthrough encloses the connecting tube. i.e., the connecting tube is surrounded by the feedthrough along its entire circumference.

Analogously the same applies of course to the separation of the single-use device from the reusable device. When the stator is in the open position, the single-use device can be separated in its entirety from the reusable device without having to disassemble the single-use device in advance or disconnect any connections between components of the single-use device. This is a considerable advantage, in particular from a hygienic point of view.

The possibility of inserting the connecting tube into the feedthrough or removing the connecting tube from the feedthrough when the stator is in the open position is also a great advantage with regard to sterility. Since the single-use device can be inserted in its entirety into the reusable device, there is no need to connect various components of the single-use device to each other until the single-use device is inserted into the reusable device. In this way, touching or contacts with the components of the single-use device are reduced to a minimum. Assembly steps to connect components of the single-use device to each other after insertion into the reusable device are not necessary, which significantly simplifies the maintenance of sterility.

Due to the embodiment according to the disclosure, it is thus possible to insert the single-use device as a pre-assembled unit in the assembled state in its entirety into the reusable device or to separate it from the reusable device.

Thus, the single-use device can be designed as a completely assembled unit. Furthermore, the single-use device can be sterilized as a completely assembled unit. Thus, the completely assembled single-use device can be sterilized enclosed in a package. Of course, the completely assembled single-use device enclosed in the package can also be sterilized in the package, for example, by applying gamma radiation.

According to a preferred embodiment, the first stator part and the second stator part are connected to each other by a joint. The jointed connection of the two stator parts is a particularly simple measure for moving the stator from the open position to the closed position or vice versa from the closed position to the open position. Thus, the stator can be unfolded and folded in a simple manner. When the stator is unfolded, the connecting tube can be inserted into the feedthrough. When the stator is then folded, the feedthrough encloses the connecting tube.

Preferably, an electrical connection is provided which is passed through the joint. This allows the stator to be unfolded and folded without the risk of damaging electrical connections.

Furthermore, it is preferred that a mechanical fixing device is provided at the stator housing, with which the first stator part is detachably fixed to the second stator part in the closed position. The mechanical fixing device can comprise, for example, a tension lock or a plurality of tension locks. Each tension lock is then arranged at the stator housing in a manner known per se such that it overlaps the abutment point between the two stator parts. The abutment point is that point at which the two stator parts are adjacent to each other in the closed position and are spaced apart from each other in the open position.

It is a further advantageous measure that a mechanical centering device is provided which centers the first stator part relative to the second stator part in the closed position of the stator. This mechanical centering device can comprise, for example, a recess disposed at one of the two stator parts, and an elevation disposed at the other of the two stator parts, wherein the recess and the elevation are designed such that the elevation engages the recess in the closed position of the stator.

According to a preferred embodiment, the stator housing is designed substantially cylindrically, wherein the first stator part is designed longer than the second stator part, viewed in the circumferential direction. For example, if the stator is designed with an uneven number of stator poles, then one of the two stator parts comprises more stator poles than the other stator part.

Of course, such embodiments are also possible, in which the two stator parts are substantially designed in the same way, i.e., for example, both stator parts comprise the same number of stator poles.

Furthermore, such embodiments are preferred in which at least one winding is provided in each stator part, wherein the number of windings in the first stator part is different from the number of windings in the second stator part.

Of course, such embodiments are also possible, in which the two stator parts comprise the same number of windings.

Preferably, the stator is designed as a bearing and drive stator, with which the rotor can be magnetically levitated without contact with respect to the stator in the operating state. This design enables a particularly cost-effective and also space-saving, compact embodiment, because the stator is not only designed as a drive stator but is also the stator for the magnetic levitation of the rotor.

According to a preferred embodiment, the rotor comprises a magnetically effective core, and the stator has a plurality of stator poles which are arranged around the magnetically effective core, and each of which is bounded in each case by an end face facing the magnetically effective core of the rotor.

Preferably, the electromagnetic rotary drive is designed as a temple motor, wherein the stator has a plurality of coil cores, each of which comprises a bar-shaped longitudinal leg which extends in the axial direction from a first end to a second end, and a transverse leg which is arranged at the second end of the longitudinal leg, and which extends in a radial direction that is perpendicular to the axial direction, wherein each transverse leg forms one of the stator poles, and wherein at least one concentrated winding is arranged at each longitudinal leg, which winding surrounds the respective longitudinal leg.

In a preferred embodiment, the rotor extends in the axial direction from a first end to a second end, wherein a magnetically effective core is provided at each end. In this embodiment, the rotary drive further comprises two stators which are arranged spaced apart with respect to the axial direction, and each of which is designed according to the disclosure, wherein each stator is arranged and designed to cooperate with exactly one of the magnetically effective cores in such a way that the rotor can be magnetically levitated without contact with respect to the stators in the operating state.

Such an embodiment of the electromagnetic rotary drive is suitable, for example, for separators or other devices in which the rotor has a large extension in the axial direction, so that it can no longer be reliably magnetically levitated without contact with only one magnetic levitation point. Then, two magnetic levitation points are provided for the rotor, namely one at the first end of the rotor and one at the second end of the rotor. The magnetically effective cores provided there each cooperate with one of the two stators so that the rotor can be magnetically levitated without contact with respect to the stator in the operating state by these two levitation points. The two stators can, but need not, be identically designed.

In this embodiment with two stators, it is also possible to design or use only one of the two stators for the drive of the rotor. However, it is also possible to design or use each of the two stators for both the drive and the contactless magnetic levitation of the rotor.

Preferably, a control device is provided which is arranged at or in the first or the second stator part. Typically, the control device comprises the power electronics for supplying and controlling the windings with which the electromagnetic fields are generated, and components for signal processing, for example, processing data which are detected by sensors such as position sensors for detecting the rotor position. In this regard, for each stator, it is possible that the control device is arranged only on or at the first stator part, or only on or at the second stator part, or that the control device is distributed between the first and second stator parts.

Furthermore, a single-use device for an electromagnetic rotary drive designed according to the disclosure is proposed by the disclosure. The single-use device comprises the rotor housing with the rotor, the single-use component, and the connecting tube.

Since in the embodiment according to the disclosure the single-use device can be inserted into the reusable device in its entirety, i.e., in the assembled state, preferably all components of the single-use device are assembled into a pre-assembled unit which can be inserted into the reusable device in its entirety.

Preferably, the single-use device is enclosed sterilized in a package. Of course, it is also possible that the single-use device is first enclosed in the package and only sterilized through the package at a later time, for example shortly before delivery to the user or by the user himself.

Further advantageous measures and embodiments of the disclosure are apparent from the dependent claims.

BRIEF DESCRIPTION OF THE DRAWINGS

In the following, embodiments of the invention will be explained in more detail with reference to the drawings.

FIG. 3: a perspective representation of a second embodiment of an electromagnetic rotary drive according to the disclosure, FIGS. 4A and 4B illustrates a schematic representation of the stator of the second embodiment in the open position (FIG. 4A) and in the closed position (FIG. 4B), each in a cross-section perpendicular to the axial direction along the section line IV-IV in FIG. 3.

DETAILED DESCRIPTION

Figure 1:
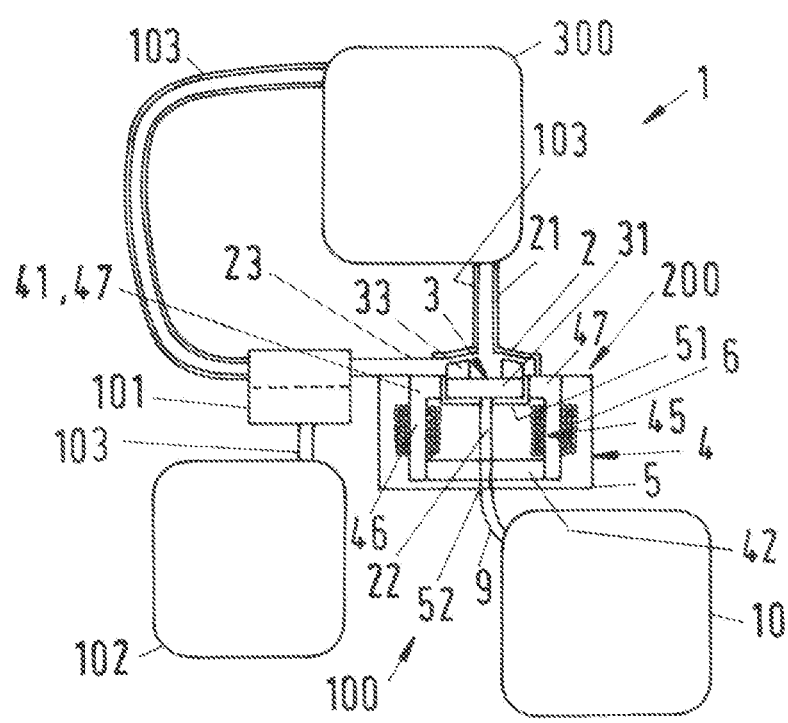
FIG. 1 illustrates a schematic representation of a first embodiment of an electromagnetic rotary drive according to the disclosure.

FIG. 1 shows a schematic representation of a first embodiment of an electromagnetic rotary drive according to the disclosure, which is designated in its entirety by the reference sign 1. In the following description, it is referred to the application case with an exemplary character that the rotary drive 1 according to the disclosure is used for biotechnological or pharmaceutical processes in which a very high degree of purity or sterility of those components that come into contact with the substances in the process is substantial.

The electromagnetic rotary drive 1 can be designed for a plurality of devices that require a rotating component, for example, for centrifugal pumps with which flowable substances are conveyed or circulated, or for mixers with which, e.g., a continuous mixing and a circulation of the nutrient liquid in a bioreactor is realized, or for separators which operate according to the principle of a centrifuge and with which flowable substances such as suspensions are divided into two phases of different density, or for filter devices, in particular rotary filters, with which, e.g., metabolic products of cells are separated from a fluid.

It is a substantial aspect of the rotary drive 1 according to the disclosure that the electromagnetic rotary drive 1 comprises a single-use device 100 designed for single use and a reusable device 200 designed for multiple use, i.e., for permanent use. Here, the single-use device 100 preferably comprises those components that come into contact with the substances in the respective process.

The term "single-use device" and other compositions with the component "single-use", such as single-use part, single-use component, etc., refer to those devices, components or parts which are designed for single-use, i.e., which can be used only once as intended and are then disposed of. For a new application, a new, previously unused single-use part must then be used. When configuring or designing the single-use device 100, substantial aspects are therefore that the single-use device 100 can be produced as simply and economically as possible, generate few costs and can be produced from materials that are available at the lowest possible price. It is another substantial aspect that the single-use device 100 can be assembled as easily as possible with the reusable device 200 to form the electromagnetic rotary drive 1. The single-use device should therefore be able to be replaced very easily without the need for high assembly effort. Particularly preferably, the single-use device 100 should be able to be assembled with or separated from the reusable device 200 without the use of tools. In sterile applications, the sterility of the single-use device 100 should not be lost when it is assembled with the reusable device.

In the electromagnetic rotary drive 1 (FIG. 1), the single-use device 100 comprises at least the following components: a rotor housing 2 with a rotor 3 arranged therein, a connecting tube 9 for a fluid, and at least one further single-use component 10, for example a reservoir or a storage container for a fluid. The rotor housing 2 comprises at least one inlet and one outlet 22, through which the fluid can be introduced into the rotor housing 2 and discharged from the rotor housing 2, respectively.

The rotor 3 in the rotor housing 2 is designed for rotation about a desired axis of rotation defining an axial direction A (FIG. 2), wherein the rotor 3 can be magnetically driven without contact. For this purpose, the rotor 3 comprises a magnetically effective core 31. The "magnetically effective core 31" of the rotor 3 refers to that region of the rotor 3 which magnetically cooperates with the stator 4 for torque generation and the generation of magnetic levitation forces.

The connecting tube 9 connects the inlet 21 or the outlet 22 of the rotor housing 2 to the single-use component 10 in such a way that in the operating state the fluid can flow through the connecting tube 9. In the embodiment represented in FIG. 1, the connecting tube 9 connects the outlet of the rotor housing 2 to the single-use component 10.

The reusable device comprises the stator 4, by which the rotor 3 can be magnetically driven without contact for rotation about the desired axis of rotation in the operating state, wherein the stator 4 comprises a plurality of windings 6 for generating an electromagnetic rotating field for driving the rotor 3. The stator 4 is arranged in a stator housing 5, which is designed as an encapsulation of the stator 4, preferably as a hermetic encapsulation.

The stator housing 5 is bounded by two end faces with respect to the axial direction A. A central recess 51 is provided in one of the two end faces, into which the rotor housing 2 can be inserted so that the rotor 3 arranged in the rotor housing 2 can magnetically interact with the stator and can be driven for rotation without contact by the windings 6 of the stator 4.

The stator housing 5 further comprises a feedthrough 52 for the connecting tube 9, which extends from the central recess 51 through the stator housing 5 to the other end face, i.e., the end face facing away from the central recess. Preferably, but not necessarily, the feedthrough 52 extends in the axial direction A. Furthermore, it is preferred that the feedthrough 52 is arranged centrally in the stator housing 5.

The feedthrough 52 serves to allow the connecting hose 9 to be guided through the stator housing 5 to the outside to the single-use component 10, from the inlet 21 or the outlet 22 of the rotor housing 2—here the outlet 22 —, in order to form a flow connection for the fluid between the rotor housing 2 and the single-use component 10 in this way.

Figure 2:
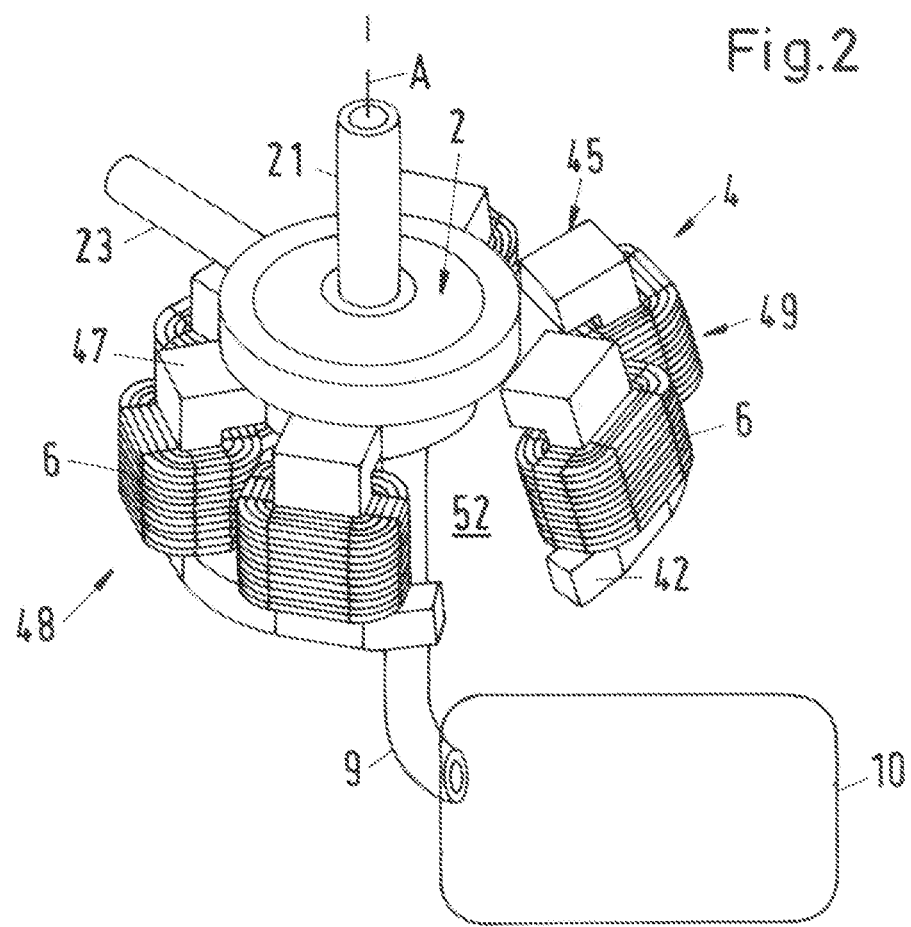
FIG. 2 illustrates a perspective representation of the stator and the rotor housing of the first embodiment in the open position of the stator (without stator housing)

For a better understanding. FIG. 2 shows a perspective representation of the stator 4, the rotor housing 2, the connecting line 9 and the single-use component 10 of the first embodiment. In FIG. 2, the stator housing 5 of the stator 4 is not represented for a better overview.

In the first embodiment, the electromagnetic rotary drive 1 is designed as a temple motor. The design as a temple motor will be explained in more detail below with reference to FIGS. 11 and 12.

In a temple motor, the stator 4 comprises a plurality of coil cores 45, each of which comprises a rod-shaped longitudinal leg 46 extending from a first end 461 (e.g., FIG. 11) in the axial direction A to a second end 462, and a transverse leg 47 arranged at the second end 462 of the longitudinal leg 46.

Each transverse leg 47 extends in a radial direction toward the rotor 3. The radial direction is a direction perpendicular to the axial direction A.

The first ends 461 of all longitudinal legs are magnetically conductively connected to each other via a reflux 42.

Thus, each coil core 45 has the shape of an L, wherein the longitudinal legs 46 each form the long leg of the L extending in the axial direction A, and the transverse legs 47 extending perpendicular to the longitudinal legs 26 in the radial direction toward the rotor 3 each form the short leg of the L. The plurality of rod-shaped longitudinal legs 46, which extend in the axial direction A and are reminiscent of the columns of a temple, have given the temple motor its name.

Each transverse leg 47 forms a respective stator pole 41. The stator poles 41 are arranged around the magnetically effective core 31 of the rotor 3. i.e., the magnetically effective core 31 of the rotor 3 is surrounded by the stator poles 41 in the operating state. The windings 6, which are preferably designed as concentrated windings 6, are arranged at the longitudinal legs 46. At least one of the concentrated windings 6 is arranged at each longitudinal leg 46, which surrounds the respective longitudinal leg 46.

In this sense, the term temple motor is to be understood in the context of the present application.

According to the disclosure, the stator 4 of the electromagnetic rotary drive 1 is openably designed with a first stator part 48 and a second stator part 49 which can be moved relative to each other, wherein in an open position of the stator 4 the connecting tube 9 can be inserted into the feedthrough 52, and wherein in a closed position of the stator 4 the feedthrough 52 encloses the connecting tube 9.

Figure 5:
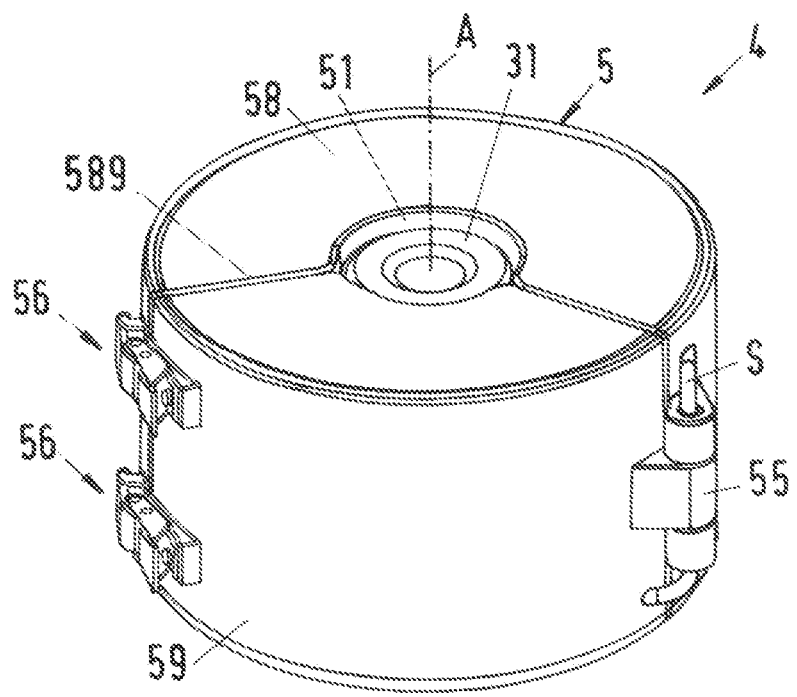
FIG. 5 illustrates a perspective representation of an embodiment of the stator housing in the closed position.

Here, preferably the first stator part 48 and the second stator part 49 are connected to each other by a joint 55 (e.g., FIG. 5). The joint 55 is preferably arranged at the stator housing 5 as explained in more detail below with reference to FIG. 5 and FIG. 6, for example. Then, the stator 4 is designed as a folding stator 4, which can be unfolded from the closed position to the open position and folded closed from the open position to the closed position.

FIG. 2 shows the stator of the first embodiment in the open position. As can be seen clearly, the connecting hose 9 can be inserted into the feedthrough 52 from the side in the open position of the stator 4, for example in a radial direction. Subsequently, the stator 4 is set into the closed position, in which the feedthrough 52 surrounds the connecting hose 9 along its entire circumference.

In contrast to the state of the art, it is therefore no longer necessary to thread the connecting tube 9 through the feedthrough 52, but the connecting tube 9 can be inserted in a simple manner into the stator 4 in the open position. When the stator 4 is then set into the closed position, the connecting tube is enclosed by the feedthrough 52.

In particular, this has the advantage that the single-use device 100 can already be completely assembled before it is inserted into the reusable device. Thus, the single-use device 100 can be assembled into a pre-assembled unit, which can then be sterilized in its entirety, and which can be enclosed in a package in its entirety in the assembled state. For the application, the completely assembled single-use device 100 is then assembled with the reusable device 200, wherein the connecting tube 9 is inserted into the feedthrough 52. Subsequently, the stator 4 is set into the closed position.

It also does not matter that the single-use component 10 usually has such dimensions that it could not be passed through the feedthrough 52, because the possibility of inserting the connecting tube 9 into the feedthrough 52 when the stator 4 is in the open position allows the connecting tube 9 to be connected to the single-use component 10 even before it is inserted into the feedthrough 52.

The following is a non-exhaustive list of some examples of what the single-use component 10 can be designed as: tank, reservoir, storage container, bioreactor, pump unit of a pump, for example of a centrifugal pump, a plurality of tubes, filter device, for example a rotary filter or the filter device of a tangential flow filter, mixer, separator insert of a separator, for example of a centrifuge separator, sensors, connecting element for the connection to other single-use components. It is understood that the single-use component 10 can also be designed as only a part of one of the foregoing examples. For example, the single-use component 10 can be designed as a foldable plastic bag that is not itself dimensionally stable and is then inserted into a dimensionally stable support container to realize, for example, a bioreactor.

In the first embodiment (FIG. 1), the electromagnetic rotary drive 1 is designed as a centrifugal pump for conveying the fluid. For this purpose, the rotor 3 of the electromagnetic rotary drive 1 is simultaneously designed as the rotor 3 of the centrifugal pump for conveying the fluid.

The rotor housing 2 is designed as a pump housing, which has the inlet 21, the outlet 22 and a second outlet 23. The inlet 21 is designed as an axial inlet 21 so that the fluid flows into the rotor housing 2 in the axial direction A. The second outlet 23 is designed as a radial or tangential outlet 23 and forms the main outlet through which the main flow of fluid is discharged from the rotor housing 2 in a radial or tangential direction. The outlet 22 is designed as an axial outlet and arranged with respect to the axial direction A on the other side of the rotor 3 as the inlet 21 in the rotor housing 2. A part of the conveyed fluid can be discharged through the outlet 22 through the connecting hose 9 into the single-use component 10, for example a storage container.

The rotor housing 2, which is designed as a pump housing, is designed in such a way that it can be inserted into the central recess 51 of the stator housing 5 such that the magnetically effective core of the rotor 31 is surrounded by the stator poles 41.

The rotor 3 comprises a plurality of vanes 33 for conveying the fluid, for example four vanes 33. The rotor 3 further comprises a jacket, not represented in detail, with which the magnetically effective core 31 of the rotor 3 is enclosed and preferably hermetically encapsulated so that the magnetically effective core 31 of the rotor 3 does not come into contact with the fluid to be conveyed. All vanes 33 are arranged on the jacket and arranged equidistantly with respect to the circumferential direction of the rotor 3. Each vane 33 extends outward in the radial direction and is connected to the jacket in a torque-proof manner. The rotor 3 with the vanes 33 forms the running wheel or the impeller of the centrifugal pump, with which the fluid or the fluids is/are acted upon.

It is an advantageous aspect that the rotor 3 is designed as an integral rotor, because it is both the rotor 3 of the electromagnetic rotary drive 1 and the rotor 3 of the centrifugal pump 100, with which the fluid is conveyed.

Particularly preferably, the stator 4 of the electromagnetic rotary drive 1 is designed as a bearing and drive stator, with which the rotor 3 can be magnetically levitated without contact with respect to the stator in the operating state.

In addition, the rotor 3—as already mentioned—can be magnetically driven without contact for rotation about the desired axis of rotation by the stator 4. The desired axis of rotation refers to that axis about which the rotor 3 rotates in the operating state when the rotor 3 is in a centered and not tilted position with respect to the stator 4. This desired axis of rotation defines the axial direction A. Usually, the desired axis of rotation defining the axial direction A corresponds to the central axis of the stator 4.

Preferably, the electromagnetic rotary drive 1 is designed according to the principle of the bearingless motor and is operated according to this principle. The term "bearingless motor" means an electromagnetic rotary drive 1 in which the rotor 3 is levitated completely magnetically with respect to the stator 4, wherein no separate magnetic bearings are provided. For this purpose, the stator 4 is designed as a bearing and drive stator, which is both the stator 4 of the electric drive and the stator of the magnetic levitation. A magnetic rotating field can be generated with the electrical windings 6 of the stator 4, which on the one hand exerts a torque on the rotor 3, which effects its rotation about the desired axis of rotation, and which, on the other hand, exerts a shear force, which can be adjusted as desired, on the rotor 3 in a radial plane perpendicular to the axial direction A, so that its radial position can be actively controlled or regulated. Thus, three degrees of freedom of the rotor 3 can be actively regulated, namely its rotation and its radial position (two degrees of freedom). With respect to three further degrees of freedom, namely its position in the axial direction A and tilting with respect to the radial plane perpendicular to the desired axis of rotation (two degrees of freedom), the rotor is passively magnetically levitated or stabilized by reluctance forces, i.e., it cannot be controlled. The absence of a separate magnetic bearing with a complete magnetic levitation of the rotor 3 is the property, which gives the bearingless motor its name. In the bearing and drive stator, the bearing function cannot be separated from the drive function.

In the case of a bearingless motor, in contrast to classical magnetic bearings, the magnetic levitation and the drive of the motor is realized by electromagnetic rotating fields. Typically, in the bearingless motor, the magnetic drive and levitation function is generated by the superposition of two magnetic rotating fields, which are usually designated as the drive and control fields. These two rotating fields generated with the windings 6 of the stator 4 usually have a pole pair number that differs by one. For example, if the drive field has the pole pair number p, the control field has the pole pair number p+1 or p−1. In this case, tangential forces acting on the magnetically effective core 31 in the radial plane are generated by the drive field, causing a torque, which causes the rotation about the axial direction A. Due to the superposition of the drive field and the control field, it is also possible to generate a shear force on the magnetically effective core 6 in the radial plane which can be adjusted as desired, with which the position of the magnetically effective core 6 in the radial plane can be regulated. Thus, it is not possible to divide the electromagnetic flux generated by the concentrated windings 6 into an (electro-) magnetic flux that only provides for driving the rotation and an (electro-) magnetic flux that only realizes the magnetic levitation.

To generate the drive field and the control field, it is possible on the one hand to use two different winding systems (see FIG. 14), namely one to generate the drive field and one to generate the control field. The coils for generating the drive field are then usually designated as drive coils and the coils for generating the control field as control coils. The current impressed in these coils is then designated as the drive current or the control current. On the other hand, it is also possible to generate the drive and levitation function with only one single winding system as in the first embodiment described here (see FIG. 2), so that there is thus no distinction between drive and control coils. This can be realized in such a way that the values for the drive current and the control current determined in each case by a control device (electronic controller) 80 (e.g., FIG. 23) are added or superimposed by calculation—i.e., for example, with the aid of software—and the resulting total current is impressed into the respective concentrated winding 6. In this case, of course, it is no longer possible to distinguish between control and drive coils.

Further details on the structure and design of the bearingless motor can be found, for example, in EP 4 083 431.

In the first embodiment represented in FIG. 1, the single-use device 100 still comprises further components, which of course are also all designed for single-use, namely a filter device 101, a collecting container 102, for a permeate filtered out in the filter device 101, and a set of connections 103 for connecting components. The connections 103 can be designed as tubes or other connecting elements. Furthermore, a bioreactor 300 for cultivating cells is provided. For this purpose, the bioreactor 300 is filled with a cell broth.

Such embodiments are possible in which the entire bioreactor 300 is designed as a single-use part, for example as a dimensionally stable plastic container. The bioreactor 300 is then a component of the single-use device 100.

Such embodiments are also possible in which only components of the bioreactor 300 are designed as single-use parts. Then, the bioreactor 300 comprises, for example, a flexible insert for receiving the fluid, which is made of a plastic.

The insert is preferably a flexible bag, for example a plastic bag or a synthetic bag, which can be folded so that it requires as little space as possible during storage. The insert can comprise additional inlets or outlets, for example for supplying additional substances, e.g., nutrient solutions or gases such as oxygen. It is also possible to provide a further inlet for receiving probes or measurement sensors with which parameters are monitored, e.g., temperature, pressure, concentrations, etc. The flexible insert is then a component of the single-use device. In this embodiment, the bioreactor 300 further comprises a dimensionally stable support container which is designed as a reusable component and to receive the insert. The support container is then a component of the reusable device 200.

Furthermore, embodiments are possible in which the bioreactor 300 is designed as a reusable component in its entirety, for example as a stainless-steel tank that can be sterilized.

As can be seen in FIG. 1, an outlet opening of the bioreactor 300 is connected via a connection 103 to the inlet 21 of the rotor housing 2 designed as a pump housing, so that the rotor 3 including the vanes 33, can convey the fluid from the bioreactor 300. The second outlet 23 of the rotor housing 2 is connected to an inlet of the filter device 101, which has a permeate outlet for the permeate and a retentate outlet for the retentate. The permeate outlet of the filter device is connected via a further connection 103 to the collecting container 102, in which the permeate is collected. The retentate outlet of the filter device is connected via a connection 103 to an inlet opening of the bioreactor 300, so that the retentate is recirculated into the bioreactor 300. The outlet 22 is connected via the connection line 9 to the single-use component 10, so that a part of the conveyed fluid is discharged from the rotor housing 2 into the single-use component 10.

The fluid, i.e., for example the cell broth, is conveyed through the filter device 101 by the rotor 3 of the electromagnetic rotary drive and recirculated into the bioreactor 300, wherein a part of the fluid is discharged into the single-use component 10. For example, metabolic products of the cells are separated in the filter device 101 by filtration and discharged as permeate or filtrate into the collecting container 102.

It is understood that the composition of the single-use device 100 of the first embodiment is to be understood with an exemplary character. Depending on the application, further or other components can also be provided in the single-use device 100.

FIG. 3 shows in a perspective view a second embodiment of an electromagnetic rotary drive according to the disclosure.

In the following description of the second embodiment, only the differences from the first embodiment will be discussed in more detail. The same parts or parts equivalent in function of the second embodiment are designated with the same reference signs as in the first embodiment. In particular, the reference signs have the same meaning as already explained in connection with the first embodiment. It is understood that all previous explanations of the first embodiment also apply in the same way or in the analogously same way to the second embodiment.

In the second embodiment of the electromagnetic rotary drive 1, the rotor 3 is again designed for a magnetic levitation without contact. In FIG. 3, the rotor 3 is not visible because it is arranged inside the rotor housing 2. With respect to the magnetic levitation, however, the rotor 3 can be designed in the analogously same way, as is represented, for example, in FIG. 8 and described further below. Compared to the first embodiment, the rotor 3 of the second embodiment is designed with a significantly larger extension with respect to the axial direction A. Accordingly, the rotor housing 2 is also designed with a larger axial extension. The axial extension of the rotor housing 2 is designated by the reference sign L. In particular, the rotor housing 2 is designed with an axial extension 1, that is at least as large and preferably larger, for example at least twice as large, as the maximum extension B of the rotor housing in the radial direction. The maximum extension 1B in radial direction is, for example, the maximum outer diameter of the rotor housing 2.

With such a long design (with respect to the axial direction A) of the rotor 3 or the rotor housing 2, it is usually no longer possible to magnetically levitate the rotor 3 without contact with only one levitation point. Therefore, in the second embodiment example, two stators 4 are provided for the magnetic levitation of the rotor 3, wherein at least one of the stators 4 is designed as a bearing and drive stator with which the rotation of the rotor 3 can be driven. Preferably, however, both stators 4 are each designed as bearing and drive stator.

The rotor housing 2 comprises two bearing housings 20, which form the two axial ends of the rotor housing 2. i.e., a bearing housing 20 is disposed at the upper axial end of the rotor housing 2 according to the representation (FIG. 3) and a bearing housing 20 is disposed at the lower axial end of the rotor housing 2 according to the representation. Preferably, the bearing housings 20 are an integral part of the rotor housing 2.

Each bearing housing 20 is designed substantially cylindrically and arranged centrally around the desired axis of rotation. Each of the bearing housings 20 is preferably designed with an outer diameter that is smaller than the maximum extension B of the rotor housing 2 in the radial direction. For each bearing housing 20, one of the two stators 4 is provided in each case, both of which are openably designed, as explained with reference to the first embodiment. The two stators 4 are attached to a support structure 400, which can be a housing wall, for example. The two stators are arranged spaced apart with respect to the axial direction A, so that in the closed position of the stators 4 one of the two stators 4 encloses one bearing housing 20, and the other of the two stators 4 encloses the other bearing housing 20.

The rotor 3 extends with respect to the axial direction A from a first end 301 (FIG. 8) to a second end 302. A magnetically effective core 31 is disposed in each case at each end 301, 302, wherein one of the magnetically effective cores 31 of the rotor 3 is arranged in each case in each bearing housing 20. The two magnetically effective cores 31 are mechanically rigidly coupled to each other, so that both magnetically effective cores 31 are connected in a torque-proof manner to the rotor 3.

Since the stators 4 are arranged and designed to enclose the bearing housings 20 of the rotor housing 2, each stator 4 is designed to cooperate with exactly one of the two magnetically effective cores 31 of the rotor 3. In the closed position of the stators 4, each stator 4 surrounds in each case one of the magnetically effective cores 31 along the entire circumference of the respective bearing housing 20.

As already mentioned, the two stators 4 can each be designed as bearing and drive stator, in particular the two stators 4 can be designed at least substantially identically. Depending on the application, however, in this embodiment with two stators 4, each designed as bearing and drive stator, it is by no means necessary to generate a torque with both stators 4 at the same time, which drives the rotation of the rotor 3. For example, it is also possible to use only one of the two stators 4 to generate a torque acting on the magnetically effective core 31 cooperating with it, and to operate the other of the two stators 4 such that it does not generate a torque that drives the rotation of the rotor 3.

In principle, of course, such embodiments are also possible in which one of the two stators 4 is designed as a pure bearing stator for the magnetic levitation of the rotor 3. This bearing stator then cannot serve to generate torque for driving the rotor 3.

It is a further difference from the first embodiment of the electromagnetic rotary drive 1 that the two stators 4, each preferably designed as a bearing and drive stator, are not designed as a stator 4 of a temple motor, but as a stator 4 of a flat motor or radial motor. Even in the embodiment as a flat motor, the electromagnetic rotary drive 1 is preferably designed and operated according to the principle of the bearingless motor. The term flat motor or radial motor refers to those embodiments in which the windings 6 for generating the electromagnetic rotary fields are arranged in the radial plane.

FIGS. 4A and 4B show in a schematic representation the stator 4 of the second embodiment in the open position (FIG. 4A) and in the closed position (FIG. 4B), in each case in a cross-section perpendicular to the axial direction A along the section line IV-IV in FIG. 3. A corresponding section through the upper stator 4 in FIG. 3 according to the representation looks the same as the representation in FIGS. 4A and 4B, because the two stators 4 are designed substantially identically. Therefore, the following explanations apply to both of the stators 4.

The magnetically effective cores 31 are preferably designed in a permanent magnetic manner. In FIGS. 4A and 4B, the magnetization of the magnetically effective cores 31 is represented in each case by the arrow without reference sign. Each magnetically effective core 31 is preferably diametrically magnetized, as indicated by the arrows without reference signs in FIGS. 4A and 4B. Each magnetically effective core 31 is designed, for example, as a permanent magnetic disk or as a permanent magnetic ring. The magnetically effective core 31 can be made entirely of a permanent magnetic material, or comprise one or more permanent magnets arranged, for example, in a soft magnetic material.

Preferably, a jacket 311 is provided with which the magnetically effective core 31 is enclosed and preferably hermetically encapsulated so that the magnetically effective core 31 does not come into contact with the fluid.

In the embodiment as a flat motor represented in FIGS. 4A and 4B, the stator 4 comprises the plurality of pronounced stator poles 41—here six stator poles 41—each extending inward in the radial direction toward the magnetic core 31 of the rotor 3 from a radially outer ring-shaped reflux 42. Each stator pole 41 is arranged in the radial plane and is bounded in each case by an end face facing the magnetically effective core 31 of the rotor 3. During operation of the electromagnetic rotary drive 1, the desired position is that the magnetically effective core 31 is centered between the end faces of the stator poles 41.

In order to generate the electromagnetic rotating fields necessary for the magnetic drive and the magnetic levitation of the rotor 3, the stator poles 41 carry the windings 6, which are again designed as concentrated windings 6, for example, in such a way that exactly one concentrated winding 6 is wound around each stator pole 41, so that each concentrated winding 6 is also arranged in the radial plane. In the operation state, the electromagnetic rotating fields for the drive and levitation of the rotor 3 are generated by these concentrated windings 6.

The openably designed stator 4 is again designed with the first stator part 48 and the second stator part 49, which are connected to each other via the joint 55 provided at the stator housing 5, so that the stator 4 can be unfolded from the open position (left-hand representation in FIG. 4A) into the closed position (right-hand representation in FIG. 4B) and vice versa from the open position into the closed position.

Also in FIG. 3, the two stators 4 are each represented in their open position. The representation of the stators 4 in FIG. 3 is strongly schematized.

As can be seen in particular in FIG. 3, in the second embodiment two connecting tubes 9 are provided, each of which would have to be guided through one of the stators 4 if the stators 4 could not be set into the open position. In the case of fixedly arranged stators 4, it would also not be possible to insert the two bearing housings 20 of the rotor housing 2 into the stators 4 because the maximum extension B of the rotor housing 2 in the radial direction is greater than the outer diameter of the bearing housings 20. Insertion would then only be possible if at least one of the two stators is arranged to be displaceable in the axial direction A. But even then, assembly of the single-use device 100 would only be possible when the rotor housing is already arranged in the stators.

In the embodiment according to the disclosure, the already completely assembled single-use device 100 can be inserted in its entirety into the stators 4. This can be seen very clearly in FIG. 3. In the open position of the two stators 4, the rotor housing 2 with the two connecting hoses 9 already connected thereto can be inserted into the two stators 4 in a simple manner. The two stators 4 are then set to the closed position so that the rotor housing 2 is fixed between the two stators 4.

The second embodiment can, for example, be designed as a separator which operates according to the principle of a centrifuge and divides a flowable substance, e.g., a suspension, into two phases of different density. The rotor housing 2 with the rotor 3 arranged therein is then designed as a separator insert, for example as a separator insert as disclosed in the already cited DE 10 2020 121 422.

The inlet 21 of the rotor housing 2 is represented by one of the connecting tubes 9 with the outlet of a centrifugal pump, of which only a pump housing 104 is represented in FIG. 3, in which the impeller of the pump is arranged. For example, the pump housing 104 can be designed in the analogously same way as the rotor housing 2 of the first embodiment. The bearing and drive unit for the pump housing 104 is not represented in FIG. 3. The centrifugal pump with the pump housing 104 conveys the suspension to be separated from a storage container (not represented) to the inlet 21 of the rotor housing 2. In the rotor housing 2, the suspension is divided into two phases of different density by centrifugal forces. One of the phases is discharged through the outlet 22 in the axial direction A through the other connecting tube 9 and through the stator 4, which is lower according to the representation, into the single-use component 10, which is designed, for example, as a collecting container. The other of the two phases is discharged through the second outlet 23, which is arranged in the circumferential surface of the rotor housing 2, and through a connection 103 into the collecting container 102.

Optionally, a reservoir 105 for a further fluid can be provided, which is supplied to the suspension before the suspension reaches the inlet 21 of the rotor housing 2. Here, the reservoir 105 is connected via a connection 103 to the connecting tube 9, which leads from the pump housing 104 of the centrifugal pump to the inlet 21 of the rotor housing 2, wherein the connection 103 opens into the connecting tube 9 upstream of the inlet 21.

In the second embodiment of the electromagnetic rotary drive 1, the single-use device 100 thus comprises, for example, the following elements: the rotor housing 2 with the rotor 3 provided therein, the single-use component 10 designed as a collecting container, the two connecting tubes 9, the pump housing 104 with the impeller provided therein, the collecting container 102, the set of connections 103 and optionally the reservoir 105.

The reusable device 200 comprises the two stators 4 with the stator housings 5.

As can best be seen in FIG. 3, also in the second embodiment of the rotary drive 1 according to the disclosure, the already completely assembled single-use device 100 can be inserted into or separated from the reusable device in its entirety when the two stators 4 are in the open position.

Figure 6:
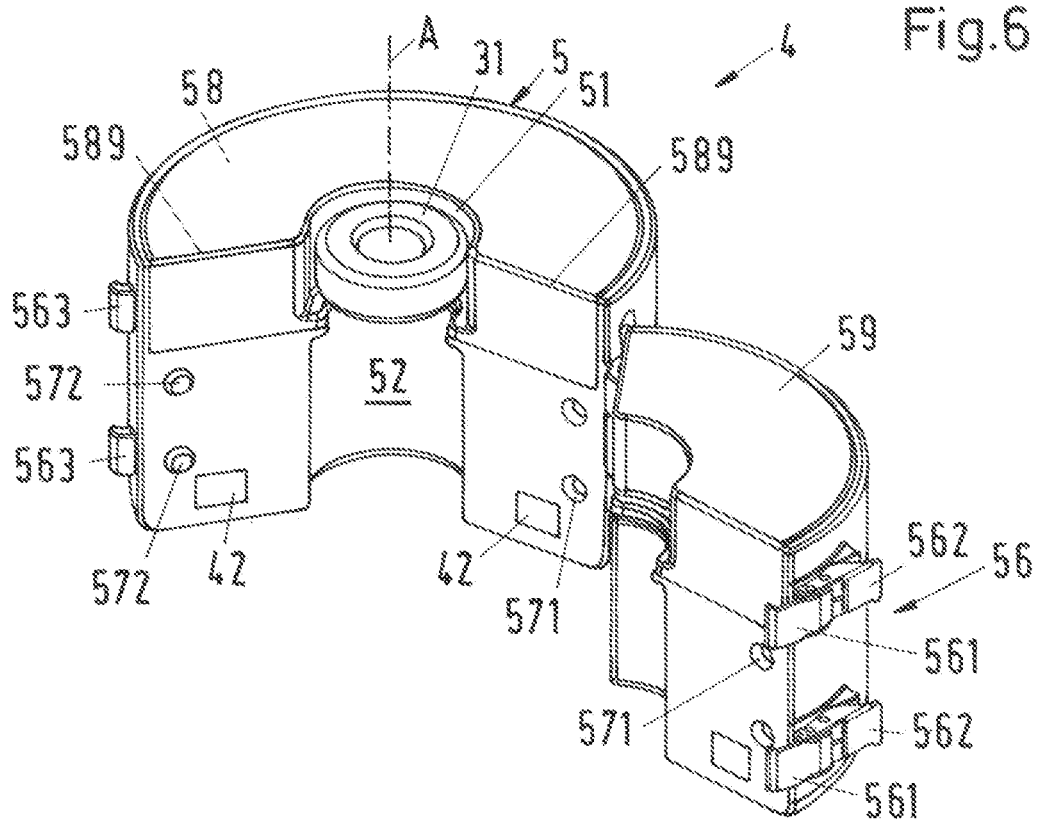
FIG. 6 illustrates the stator housing from FIG. 5 in the open position.
Figure 7:
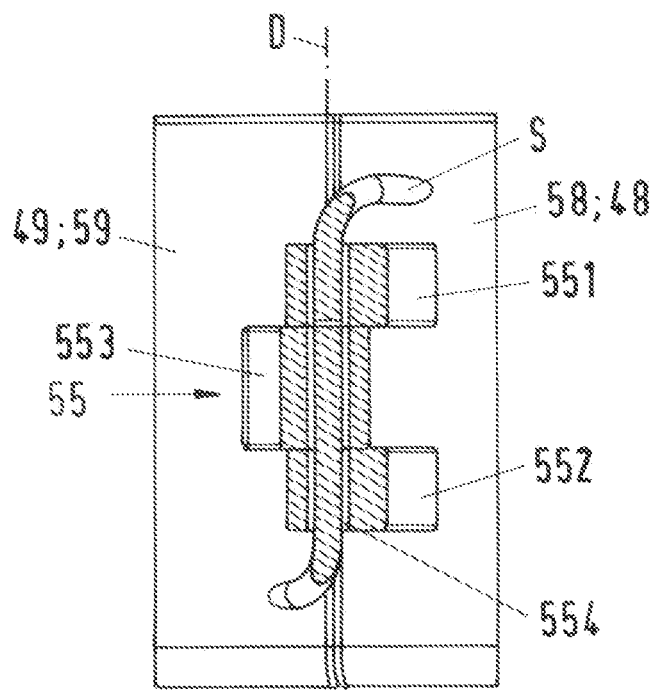
FIG. 7 illustrates a sectional representation of the joint of the stator housing from FIG. 5 in a section in the axial direction.

Referring to FIGS. 5 to 7, a preferred embodiment of the stator 4 and in particular of the stator housing 5 of the stator 4 will now be explained, which is suitable in principle for all stators 4 explained in the context of this application. The stator housing 5 is suitable both for stators 4 in the embodiment of the electromagnetic rotary drive 1 as a temple motor, and for stators 4 in the embodiment of the electromagnetic rotary drive 1 as a flat motor or radial motor.

FIG. 5 and FIG. 6 each show a perspective representation of the stator 4, wherein in FIG. 5 and FIG. 6 only the stator housing 5 of the stator 4 can be seen in each case, because the components of the stator arranged inside the stator housing 5, such as the stator poles 41, are covered by the stator housing 5. For a better understanding, the magnetically effective core 31 of the rotor 3 with which the stator 4 cooperates is represented in each case in FIG. 5 and FIG. 6. FIG. 5 shows the stator 4 in the closed position, and FIG. 6 shows the stator 4 in the open position.

FIG. 7 shows in a sectional representation the joint 55, which connects the two stator parts 48, 49 to each other, in a section in the axial direction A.

The stator housing 5 comprises the first housing part 58, which forms the jacket of the first stator part 48, and the second housing part 59, which forms the jacket of the second stator part 49. Preferably, the first stator part 48 is encapsulated by the first housing part 58, and the second stator part 49 is encapsulated by the second housing part 59. Preferably, the encapsulation of the first stator part 48 and the encapsulation of the second stator part 59 are each designed as hermetic encapsulation.

The stator housing 5 has a substantially cylindrical design and is bounded in the axial direction A by two end faces. The central recess 51, into which the rotor housing 2 can be inserted, is provided in one of the two end faces. The feedthrough 52 extends from the recess 51, preferably in axial direction A and in the center of the stator housing 5, to the other end face of the stator housing 5.

Each of the two housing parts 58, 59 is preferably designed as a separate housing part 58, 59, which together form the cylindrical housing 5. Thus, each housing part 58, 59 is designed as a cylinder segment, wherein the cylinder segments complement each other to form a cylinder.

The coil cores 45 and/or the stator poles 41 and the windings 6, which belong to the first stator part 48, and the part of the reflux 42 which connects these coil cores 45 to each other are arranged in the first housing part 58.

The coil cores 45 and/or the stator poles 41 and the windings 6, which belong to the second stator part 48, and the part of the reflux 42 which connects these coil cores 45 to each other are arranged in the second housing part 59.

When viewed in the circumferential direction, the two housing parts 58, 59 can have different lengths. As can be seen in particular in FIG. 5, in the embodiment described here the first housing part 58 is longer than the second housing part 59 when viewed in the circumferential direction. This embodiment is particularly preferred if the stator 4 has an uneven number of stator poles 41 or coil cores 45, for example five stator poles 41 or five coil cores 45 (see, for example, FIG. 11 and FIG. 12). Then, for example, three stator poles 41 or three coil cores 45 are disposed in the first housing part 58 and two stator poles 41 or two coil cores 45 are disposed in the second housing part 59.

The control device 80, which comprises, for example, the power electronics for controlling and supplying the windings 6 and signal processing electronics, can be arranged in one of the two housing parts 58, 59, or it can be distributed between the first housing part 58 and the second housing part 59, as will be described later.

In the closed position (see FIG. 5), the two housing parts 58, 59, each designed as cylinder segments, adjoin each other at two boundary surfaces. The joint 55 is arranged at one of these boundary surfaces which connects the two housing parts 58, 59 in an articulated manner. The other boundary surface is designated as the abutment point 589. In the closed position of the stator 4, the two housing parts 58, 59 abut each other at the abutment point 589. In the open position of the stator 4, the stator 4 is open at the abutment point when viewed in the circumferential direction (FIG. 6), so that the two housing parts 58, 59 do not touch here.

The first housing part 58 and the second housing part 59 are connected to each other via the joint 55 so that the two housing parts 58, 59 can be pivoted relative to each other. The joint 55 is arranged at the outer circumferential surface of the stator housing 5. By a movement of the second housing part 59 relative to the first housing part 58, the stator 4 can be unfolded. i.e., set from the closed position (FIG. 5) to the open position (FIG. 6), and folded closed, i.e., brought from the open position to the closed position. The pivoting movement with which the second housing part 59 can be moved relative to the first housing part 58 takes place about an axis which extends in the axial direction A.

As already mentioned, each housing part 58, 59 is preferably designed as an encapsulation, in particular as a hermetic encapsulation, of the respective stator part 48, 49, i.e., each stator part 48, 49 is preferably designed as an encapsulation in itself.

The two-part design of the stator 4 has the consequence that the magnetic reflux 42, which magnetically couples the stator poles 41 to one another, is interrupted or separated at two points, namely at the two boundary surfaces between the two housing parts 58, 59. These interruptions are designed in such a way that they represent the least possible disturbance of the magnetic flux in the reflux 42. This can be achieved, for example, by a particularly thin design of the respective housing part 58, 59 at the boundary surfaces and in the region of the reflux 42, as indicated by the rectangles in the boundary surfaces in FIG. 6. It is also possible to apply a surface coating to these interruptions in the reflux 42 which is connected in a sealing manner to the respective housing parts 58 and 59, so that the encapsulation of the first stator part 48 and the second stator part 49 is ensured.

By such measures it is possible to design both stator parts 48, 49 each encapsulated and at the same time to ensure a good magnetic connection between the two stator parts 48, 49 via the reflux 42.

Furthermore, it is preferred if a mechanical fixing device 56 is provided at the stator housing 5, by which the first stator part 48 is detachably fixed to the second stator part 49 in the closed position of the stator 4 (FIG. 5), in order to securely prevent an unintentional unfolding of the stator 4. In the embodiment described here, the mechanical fixing device 56 comprises two tension locks, each of which overlaps the abutment point 589 between the two housing parts 58, 59. The two tension locks are arranged on the outer circumferential surface of the stator housing 5 and spaced apart with respect to the axial direction A. Each tension lock can, for example, be designed in a manner known per se as follows. On one of the two housing parts 58, 59—here on the second housing part 59—a claw 561 is attached to a foldable tab 562, which is fixed to the second housing part 59. The foldable tab 562 serves to tension the claw 561. On the other housing part, i.e., here the first housing part 58, a projection 563 is attached, which can be overlapped by the claw 561. After the stator 4 has been set from the open position to the closed position, the claw 561 is placed over the projection 563 and tensioned by the foldable tab 562. As a result, the first housing part 58 is fixed to the second housing part 59 and the stator 4 is secured against unintentional opening. To open the stator 4, the claw 561 is released from the projection 563 by actuating the tab 562, and the stator 4 can be unfolded from the closed position to the open position.

Furthermore, it is preferred that at least one mechanical centering device is provided which centers the first stator part 48 relative to the second stator part 49 in the closed position of the stator 4. In this case, recesses 571 and elevations 572 are provided as mechanical centering devices, which are designed and arranged in such a way that, in the closed position of the stator 4, each elevation 572 engages in one of the recesses 571, preferably engages in a precisely fitting manner, and thus centers the two stator parts 48, 49 relative to each other. For example, two elevations 572 and two recesses 571 are provided in the surfaces of the housing parts 58, 59, which form the abutment point 589 in the closed position, wherein the elevations 572 are disposed in the surface of the first housing part 58 and the recesses 571 in the surface of the second housing part 59. Furthermore, it is possible to provide recesses 571 and elevations 572 engaging therein as centering also in the other boundary surface between the two housing parts 58, 59, i.e., where the joint 55 is provided. The mechanical centering devices 571, 572 ensure a complete overlapping of the magnetic reflux 42 at the two interruptions in the boundary surfaces, so that the least possible disturbance of the magnetic flux at these interruptions is ensured. Offsets in the magnetic circuit can be efficiently prevented by the mechanical centering devices 571, 572.

Figure 18:
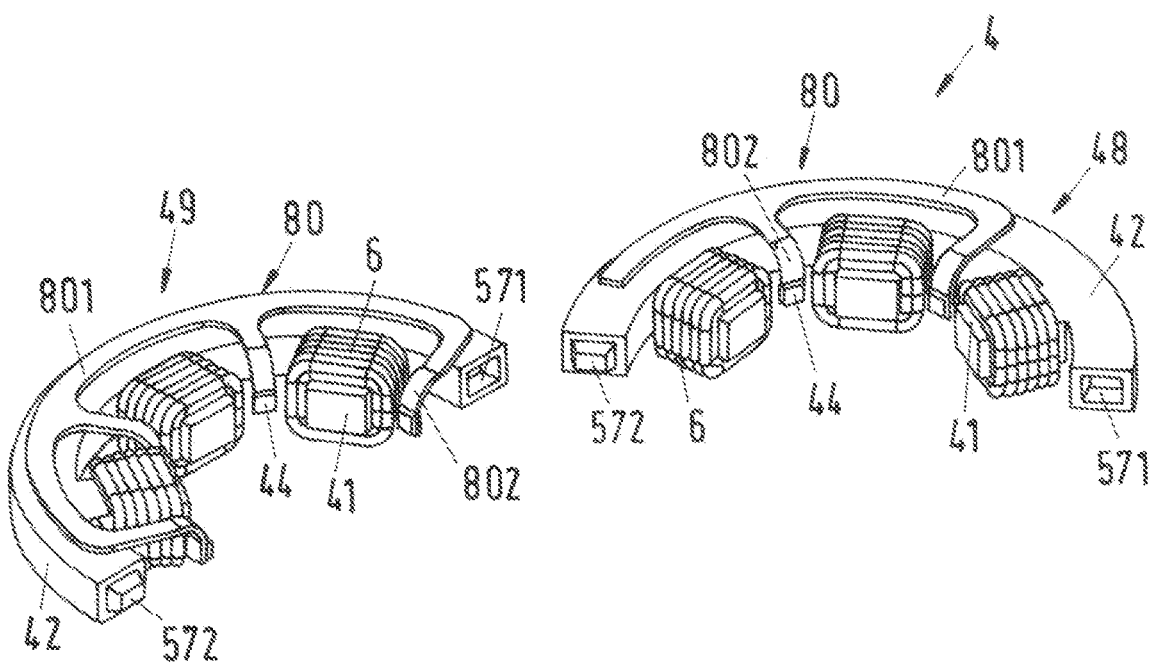

Alternatively or additionally, it is also possible to provide the elevations 572 and the recesses 571 in the magnetic reflux 42 (see, for example, FIG. 18).

As is represented in FIG. 7, another preferred measure is to provide an electrical connection S between the first stator part 48 and the second stator part 49, which is passed through the joint 55.

In FIG. 7, the joint 55 is shown in a sectional representation. The joint 55 is designed in such a way that the second stator part 49 can be pivoted relative to the first stator part 48 in order to move the stator 4 from the closed position to the open position or from the open position to the closed position. The pivoting movement takes place about an axis of rotation D, which extends in the axial direction A. The joint 55 comprises a first joint part 551 and a second joint part 552, both of which are fixed to the first housing part 58 and are connected thereto in a torque-proof manner. The first joint part 551 and the second joint part 552 are arranged spaced from each other with respect to the axial direction A. A third joint part 553 is fixed to the second housing part 59 and connected thereto in a torque-proof manner. The third joint part 553 is arranged between the first joint part 551 and the second joint part 552 with respect to the axial direction A and is rotatably mounted relative to the first and second joint part 551, 552 so that the third joint part 553 can be pivoted or rotated relative to the first and second joint parts 551, 552 about the axis of rotation D. Each of the joint parts 551, 552, 553 has a central passage extending in the axial direction A through the entire joint part 551, 552, 553, wherein these three passages are designed to be aligned with one another, so that a central passage 554 results overall, which extends in the axial direction A through the entire joint 55. The electrical connection S is arranged in this passage 554, via which the first stator part 48 is electrically connected to the second stator part 49.

Passing the electrical connection S between the first stator part 48 and the second stator part 49 centrally in the axial direction A through the joint 55, i.e. in the axis of rotation D of the joint 55, has the advantage that the relative pivoting movements between the two stator parts 48, 49 result at most in very slight deformations of the electrical connection S, which is particularly gentle on the material and advantageous in terms of a long service life.

For a better understanding, the electrical connection S outside the joint 55 is represented as an exposed pipe in FIGS. 5-7. For many applications, however, it is preferred if the electrical connection S is not exposed but is covered, for example, by a cover.

Of course, other embodiments and arrangements of the electrical connection S between the first stator part 48 and the second stator part 49 are also possible, for example electrical connections which are arranged outside the axis of rotation D, or flexible embodiments by flexible electrical connections which are designed for the connection between components that can be moved relative to one another, in particular that can be pivoted.

With regard to the preferred materials for the stator housing 5, it is preferred that the stator housing 5, at least in the areas where the reflux 42 is separated and protected by the housing parts 58, 59, namely at the two boundary surfaces between the two housing parts 58, 59, is made of materials that are electrically non-conductive or at least only slightly conductive and yet hard-wearing, for example with regard to mechanical stresses. In addition, the stator housing 5 should be made of materials that are solvent resistant, so that the stator housing 5 can be cleaned with alcohol or other solvents. For example, plastics such as polyetheretherketone (PEEK) or polyoxymethylene copolymer (POM-C) belong to the non-conductive materials. Metal alloys such as Hastelloy or high-alloy titanium alloys (for example, Grade 5) belong to the relatively poorly conductive materials.

Furthermore, it is a preferred measure that each housing part 58, 59 with the respective components of the stator 4 arranged therein is preferably cast with a plastic, for example with an epoxy resin, polyurethane or silicone. This has the advantage that the stator 4 remains very dimensionally stable, even if the stator housing 5 is designed with a thin wall.

Figure 8:
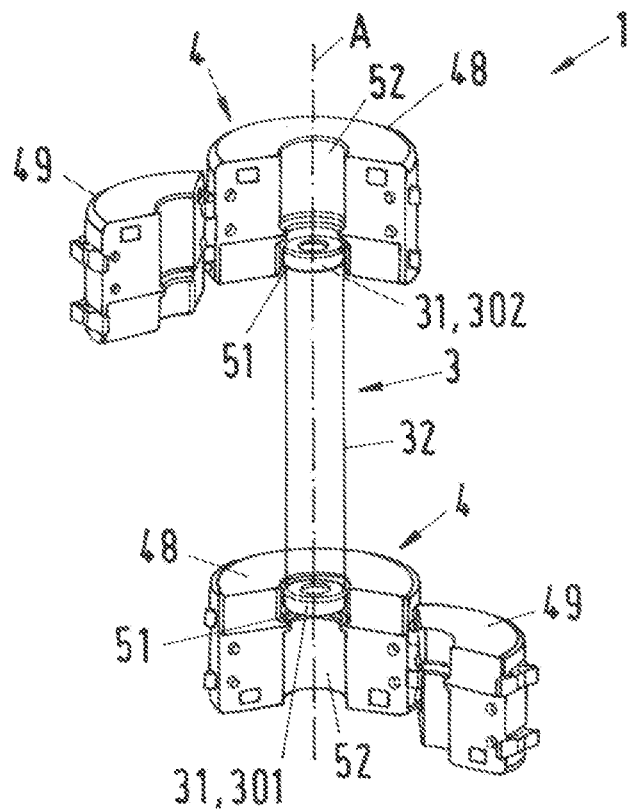
FIG. 8 illustrates a perspective representation of a third embodiment of an electromagnetic rotary drive according to the disclosure, wherein the stator is in the open position.
Figure 9:
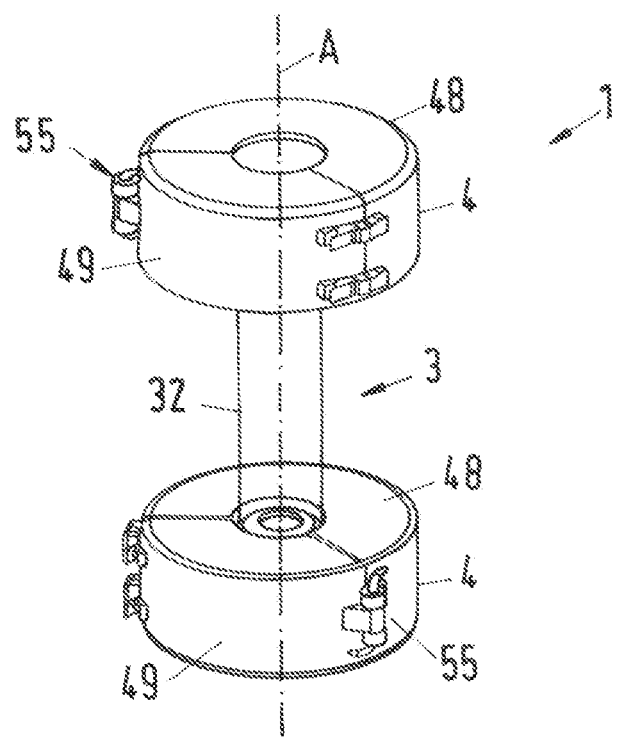
FIG. 9 illustrates as FIG. 8, but with the stator in the closed position.

FIG. 8 shows a perspective representation of a third embodiment of an electromagnetic rotary drive 1 according to the disclosure, wherein the stator 4 is in the open position. FIG. 9 shows this third embodiment with the stator 4 in the closed position. For a better understanding, the rotor housing 2 is not represented in FIG. 8 and FIG. 9. It is understood that in the third embodiment the rotor 3 is also arranged in a rotor housing 2, which can be designed, for example, analogously to the second embodiment. In FIG. 8 and FIG. 9, the connecting tube 9 or the connecting tubes 9 are also not represented because they are arranged at the rotor housing 3.

In the following description of the third embodiment, only the differences from the first and second embodiment will be discussed in more detail. The same parts or parts equivalent in function of the third embodiment are designated with the same reference signs as in the first and second embodiment. In particular, the reference signs have the same meaning as already explained in connection with the first and second embodiment. It is understood that all previous explanations also apply in the same way or in the analogously same way to the third embodiment.

In the third embodiment, the rotor 3 is also designed for a contactless magnetic levitation. Similar to the second embodiment, the rotor 3 is designed with a large extension in the axial direction A. With such a long design of the rotor 3 with respect to the axial direction A, it is usually no longer possible to reliably levitate the rotor 3 magnetically without contact with respect to the stator 4 with only a single levitation point. Therefore, in the third embodiment, two stators 4 are provided for the magnetic levitation of the rotor 3 in the analogously same way as in the second embodiment.

The rotor 3 extends in the axial direction A from the first end 301 to the second end 302, wherein a magnetically effective core 31 is disposed at each end 301, 302. Two stators 4 are provided, which are arranged spaced apart with respect to the axial direction A, and each of which is openably designed. Each stator 4 is arranged and designed to cooperate with exactly one of the magnetically effective cores 31 in such a way that the rotor 3 can be magnetically levitated without contact with respect to the stators 4 in the operating state.

In addition to the two magnetically effective cores 31 which are arranged at the two ends 301, 302, only a rod 32 is represented of the rotor 3, which rod extends from the magnetically effective core 31 at the first end 301 of the rotor 3 in the axial direction A to the magnetically effective core 31 at the second end 302 of the rotor 3. The rod 32 is made of plastic, for example. Each magnetically effective core 31 is connected to the rod 32 in a torque-proof manner. The rod 32 forms a mechanically rigid coupling between the two magnetically effective cores 31 at the ends 301, 302 of the rotor 3 so that the two magnetically effective cores 31 cannot be moved relative to each other.

Depending on the application, the rotor 3 still comprises further components which are not represented in FIG. 8 and FIG. 9. If the electromagnetic rotary drive 1 is designed as a mixer, for example, one or more impellers can be disposed on the rod 32 for mixing at least two substances. The electromagnetic rotary drive 1 can also be designed as a rotary filter. In this case, the rotor 3 comprises at least one filter element. The electromagnetic rotary drive 1 can also be designed as a separator for separating a flowable substance into different phases by centrifugal forces (see also the fourth embodiment). In this case, the rotor 3 comprises, for example, a plurality of separation discs which are connected to the rod 32 in a torque-proof manner.

Each of the two stators 4 is designed in particular as explained in connection with FIG. 5 and FIG. 6, i.e., in each case with the stator housing 5 comprising the two housing parts 58, 59, which are connected to each another by the joint 55.

The two stators 4 are designed substantial identically and in particular as explained with reference to FIG. 5 and FIG. 6. The two stators 4 are arranged such that their axial center axes are aligned with each other and lie on the desired axis of rotation. Furthermore, the stators 4 are arranged such that the two central recesses 51 for the rotor 3 or the rotor housing 2 are opposite each other. The lower stator 4 according to the representation is arranged such that the central recess 51 is in the upper end face of said stator 4 according to the representation, and the upper stator 4 according to the representation is arranged such that its central recess 51 is in the lower end face of said stator 4 according to the representation.

When the rotor 3 or the rotor housing 2 is inserted into the stators 4, the magnetically effective core 31 at the first end 301 of the rotor 3 is arranged in the central recess 51 of the lower stator 4 according to the representation, and the magnetically effective core 31 at the second end 302 of the rotor is arranged in the central recess 51 of the upper stator 4 according to the representation. The at least one connecting tube 9 (not represented in FIG. 8 and FIG. 9) is arranged in the feedthrough 52 of the upper or the lower stator 4. Of course, a connecting hose 9 can also be disposed in each case in the feedthrough 52 of each stator 4.

In the third embodiment, the already completely assembled single-use device 100, of which only the rotor 3 is represented in FIG. 8 and FIG. 9, can also be inserted in its entirety into the two stators 4 when the two stators are in the open position represented in FIG. 9. In the open position of the stators 4, it is also possible to remove the single-use device 100 in its entirety from the two stators 4 without first having to disassemble the single-use device 100 into its components or having to separate components of the single-use device 100 from each other.

In the third embodiment, the single-use device 100 also comprises at least the following components: the rotor housing 2 with the rotor 3 arranged therein, at least one single-use component 10 (for example, a storage container), at least one connecting tube 9, which connects the rotor housing 3 to the single-use component 10.

As already mentioned, it is not necessary that the two stators 4 are designed identically. As already explained for the second embodiment, it is thus possible, for example, that one of the two stators 4 is designed as a pure bearing stator for the magnetic levitation of the rotor 3, so that no torque can be exerted on the rotor 3 with this stator 4.

According to another variant of the third embodiment, only one of the two stators is openably designed, while the other stator is designed classically, i.e., cannot be brought into an open position. The rotor housing 2 can then be inserted into this non-openably designed stator in axial direction A, while it is inserted into the other stator 4, which is openably designed, from the side, i.e., in radial direction.

Figure 10:
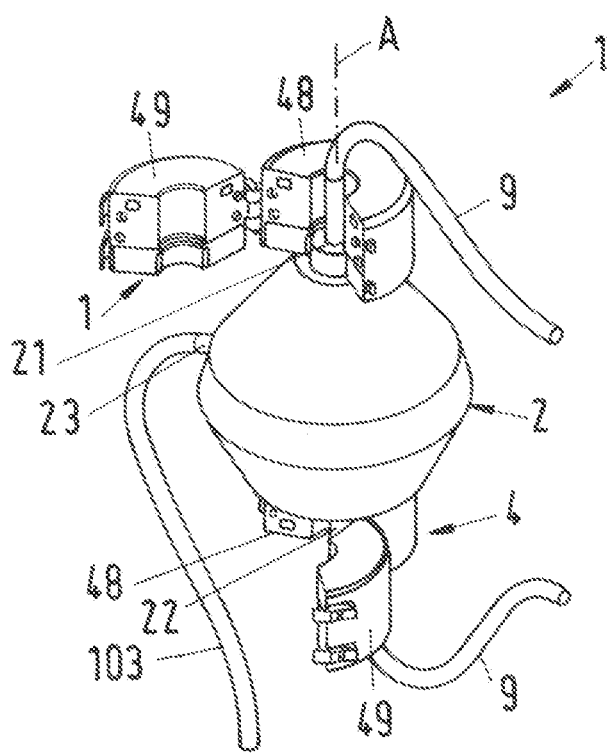
FIG. 10 illustrates a perspective representation of a fourth embodiment of an electromagnetic rotary drive according to the disclosure, wherein the stator is in the open position.

FIG. 10 shows a perspective representation of a fourth embodiment of an electromagnetic rotary drive 1 according to the disclosure, wherein the stator 4 is in the open position. In FIG. 10, the rotor 3 is not visible because it is arranged inside the rotor housing 2. With respect to the magnetic levitation, however, the rotor 3 can be designed in the analogously same way as described for the third embodiment.

In the following description of the fourth embodiment, only the differences from the first, second and third embodiment will be discussed in more detail. The same parts or parts equivalent in function of the fourth embodiment are designated with the same reference signs as in the first, second or third embodiment. In particular, the reference signs have the same meaning as already explained in connection with the first, second and third embodiment. It is understood that all previous explanations also apply in the same way or in the analogously same way to the fourth embodiment.

The fourth embodiment represents a special embodiment of the third embodiment, in which the rotor housing 2 with the rotor 3 arranged therein is designed as a separator which operates according to the principle of a centrifuge and divides a flowable substance. e.g., a suspension, into two phases of different density. Then, the rotor housing 2 with the rotor 3 arranged therein is designed as a separator insert, for example as a separator insert as disclosed in the already cited DE 10 2020 121 422.

In the fourth embodiment, the single-use device 100 comprises two connecting tubes 9.

The inlet 21 of the rotor housing 2 is connected via one of the connecting tubes 9 to a source for the suspension, for example a pumping device (not represented), which conveys the suspension from a storage container (not represented), through the connecting tube 9 to the inlet 21 of the rotor housing 2. The suspension is divided into two phases of different density in the rotor housing 2 by centrifugal forces. One of the phases, namely the lighter phase (phase with lower density), is discharged through the outlet 22 in the axial direction A through the other connecting tube 9 and through the lower stator 4 according to the representation into the single-use component 10 (not represented), wherein the single-use component 10 is designed, for example, as a collecting container. The other of the two phases, namely the heavier phase (phase with higher density), is discharged through the second outlet 23, which is arranged at the radially outer boundary surface of the rotor housing 2, and through a connection 103 into a collecting container 102 (not represented).

When both stators 4 are in the open position, as represented in FIG. 10, the rotor housing 2 with the rotor 3 arranged therein and with the connecting lines 9 already connected to the rotor housing 2 and with the single-use component 10 (not represented) connected to one of the connecting lines 9 can be inserted into the two stators 4 in the radial direction. Thus, also in the fourth embodiment, the already completely assembled single-use device 100 can be inserted into the stators 4. i.e., assembled with the reusable device 200, or separated therefrom.

When the single-use device 100 is inserted into the two stators 4, the two stators 4 are brought into the closed position by being folded and are secured in the closed position against unintentional unfolding by the mechanical fixing devices 56. Thus, the rotor housing 2 is securely fixed between the two stators 4. When both stators 4 are in the closed position, the rotor housing 2 is secured against both rotary movements and translational movements.

It is understood that the two stators 4 are fixed to a support structure 400 (FIG. 3), for example to a housing wall.

With reference to FIG. 11-FIG. 22, different variants for the embodiment of the stator 4 are now described, which are suitable for the above-described embodiments. Here, both variants of the stator 4 for the embodiment of the electromagnetic rotary drive 1 as a temple motor and variants for the embodiment of the electromagnetic rotary drive 1 as a flat motor or radial motor are described. In all variants, the stator 4 is preferably designed as a bearing and drive stator, with which the rotor 3 can be magnetically driven for rotation without contact and can be magnetically levitated without contact with respect to the stator 4 in the operating state. Preferably, the electromagnetic rotary drive 1 is designed according to the principle of the bearingless motor previously described and is operated according to this principle. In embodiments of the electromagnetic rotary drive 1 according to the disclosure in which more than one stator 4 is provided, at least one of the stators 4 is designed as a bearing and drive stator for the operation as a bearingless motor.

In all FIG. 11-FIG. 22, the stator housing 5 is not represented in each case for reasons of a better overview. It is understood that in all variants the first stator part 48 comprises a fit housing part 58 (FIG. 5, FIG. 6), and the second stator part 49 comprises a second housing part 59. Preferably, the first housing part 58 and the second housing part 59 are each designed as encapsulation of the first stator part 48 and the second stator part 49, respectively. In particular, the first stator part 48 and the second stator part 49 can each be designed to be hermetically encapsulated.

For all described variants for the embodiment of the stator 4, the respective stator housing 5 can be designed in the same way or in an analogously same way, as explained with reference to FIG. 5 and FIG. 6.

It is understood that the measures or embodiments described for a specific variant can also be combined with the other variants in the same way or in an analogously same way, even if they are not explicitly mentioned there.

Figure 11:
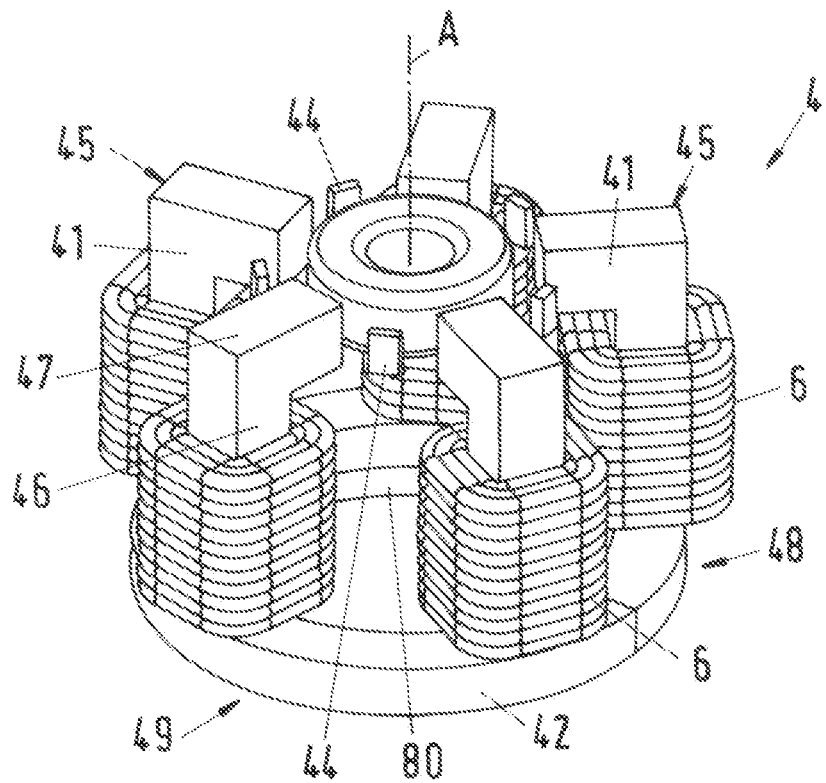
FIG. 11 illustrates a perspective representation of a first variant for the embodiment of the stator, wherein the stator is in the closed position.
Figure 12:
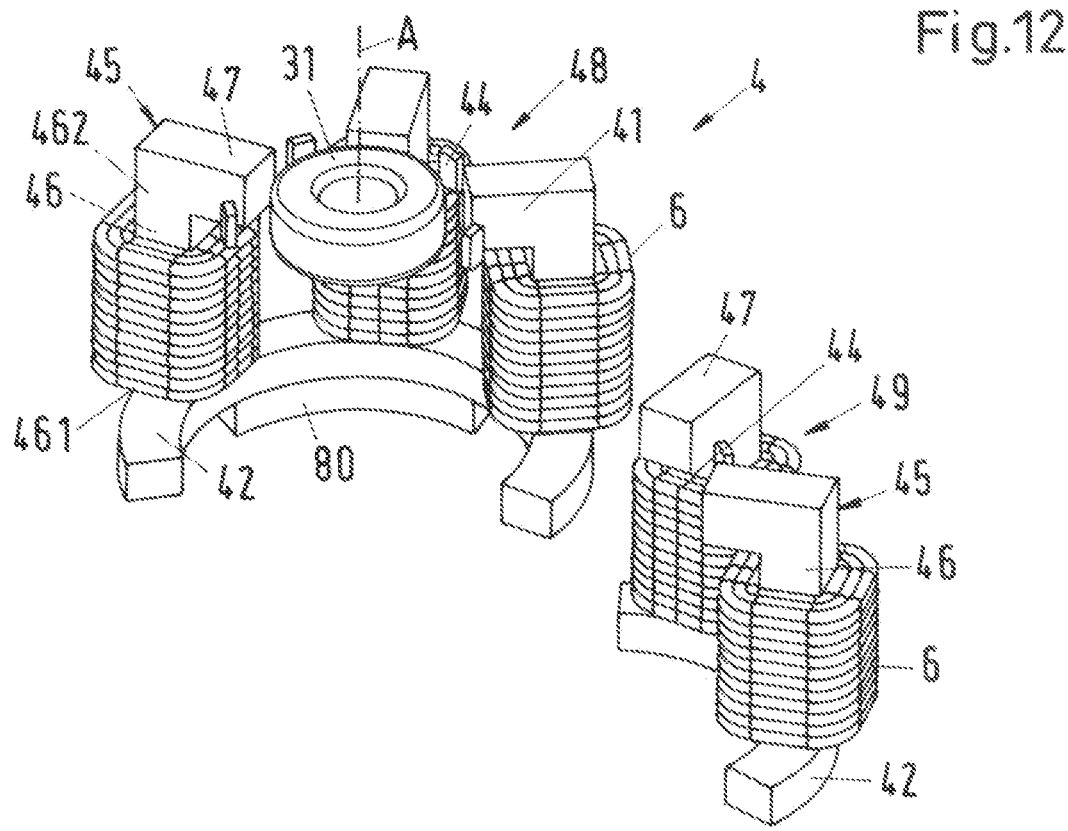
FIG. 12 illustrates the stator from FIG. 11 in the open position.

FIG. 11 shows a perspective view of a first variant for the embodiment of the stator 4, wherein the stator is in the closed position. FIG. 12 shows this stator 4 in the open position.

The first variant of the stator 4 is suitable for an embodiment of the electromagnetic rotary drive 1 as a temple motor.

The stator 4 comprises a plurality, here five, of the coil cores 45, each of which comprises the rod-shaped longitudinal leg 46 which extends from the first end 461 in the axial direction A to the second end 462, and the transverse leg 47 which is arranged at the second end 462 of the longitudinal leg 46. Each transverse leg 47 extends in the radial direction towards the magnetically effective core 31 of the rotor 3 and is bounded by an end face facing the magnetically effective core 31.

The five coil cores 45 are arranged equidistantly on a circular line in the closed position of the stator 4 so that the end faces of the transverse legs 47 surround the magnetically effective core 31 of the rotor 3. The magnetically effective core 31 of the rotor 3 is designed as a permanent magnetic disk or as a permanent magnetic ring which is preferably diametrically magnetized.

Each transverse leg 47 forms a respective stator pole 41. The stator poles 41 are arranged around the magnetically effective core 31 of the rotor 3, i.e., the magnetically effective core 31 of the rotor 3 is surrounded by the stator poles 41 in the operating state.

The first ends 461 of the longitudinal legs 46 are connected, as viewed in the circumferential direction, by the ring-shaped reflux 42. The reflux 42 is preferably designed in an ring-shaped shape or comprises a plurality of segments which connect the longitudinal legs 46 to one another. Both the reflux 42 and the coil cores 45 of the stator 4 are each made of a soft magnetic material, because they serve as flux conducting elements to conduct the magnetic flux. Suitable soft magnetic materials for the coil cores 45 and the reflux 42 are, for example, ferromagnetic or ferrimagnetic materials, i.e., in particular iron, nickel-iron, cobalt-iron silicon iron or mu-metal. Here, for the stator 4, a design as a stator laminate stack is preferred in which the coil cores 45 and the reflux 42 are designed as laminations, i.e., they consist of several thin laminations which are stacked. The reflux 42 can also comprise, for example, several segments, each of which is arranged between two adjacent coil cores 45.

In the operating state, the magnetically effective core 31 rotates about the desired axis of rotation, which defines the axial direction A, wherein the rotor 3 is magnetically driven without contact and magnetically levitated without contact with respect to the stator 4. In this case, the radial position of the rotor 3 or the magnetically effective core 31 is regulated such that it is in a centered position between the stator poles 41. A plurality of sensors 44 is provided for regulating the drive and the position of the rotor 3, for example position sensors which are preferably arranged with respect to the circumferential direction in each case between the end faces of two adjacent transverse legs 47. All sensors 44, i.e., in this case five sensors 44, are signal-connected to the control device 80, which is preferably also arranged inside the stator housing 5, for example between the reflux 42 and a bottom of the stator housing 5, or also radially inwardly with respect to the reflux 42.

In order to generate the electromagnetic rotating fields required for the magnetic drive and the magnetic levitation of the magnetically effective core 31 of the rotor 3, the longitudinal legs 46 carry the windings which are designed as concentrated windings in each case. Exactly one concentrated winding 6 is arranged around each longitudinal leg 46. In the operating state, those electromagnetic rotating fields are generated with these concentrated windings 6 with which a torque is effected on the rotor 3 and with which a shear force, which can be adjusted as desired, can be exerted on the magnetically effective core 31 of the rotor 3 in the radial direction, so that the radial position of the magnetically effective core 31, i.e., its position in the radial plane perpendicular to the axial direction A, can be actively controlled or regulated.

In the first variant described here, the drive and bearing function is thus carried out with only one single winding system, namely with the five concentrated windings 6. For this purpose, the respective value for the drive current and the control current is determined in the control device 80. The two values are then added or superimposed by calculation—i.e., e.g., with the aid of software—and the resulting total current is impressed in the respective concentrated winding 6.

For this purpose, the control device 80 is signal-connected to each winding 6 and comprises the power electronics for supplying and controlling the windings 6.

The stator 4 comprises the first stator part 48, which here comprises three coil cores 45 with the windings 6 arranged thereon, a part of the reflux 42 and four position sensors 44. These components of the first stator part 48 are arranged in the first housing part 58 (see, for example, FIG. 6) and are preferably encapsulated by this first housing part 58. Furthermore, the control device 80 or parts of the control device 80 can be arranged in the first housing part 58.

The stator 4 further comprises the second stator part 49, which here comprises two coil cores 45 with the windings 6 arranged thereon, a part of the reflux 42 and one of the position sensors 44. These components of the second stator part 49 are arranged in the second housing part 59 (see, for example, FIG. 6) and are preferably encapsulated by this second housing part 59. Furthermore, the control device 80 or parts of the control device 80 can be arranged in the second housing part 59.

The two housing parts 58, 59 are connected to each other via the joint 55 and are designed such, for example, as explained with reference to FIG. 5 and FIG. 6. Thus, the stator 4 is openably designed with the first stator part 48 and the second stator part 49, which can be moved relative to each other so that the stator 4 can be folded closed from the open position into the closed position and unfolded from the closed position into the open position.

Figure 13:
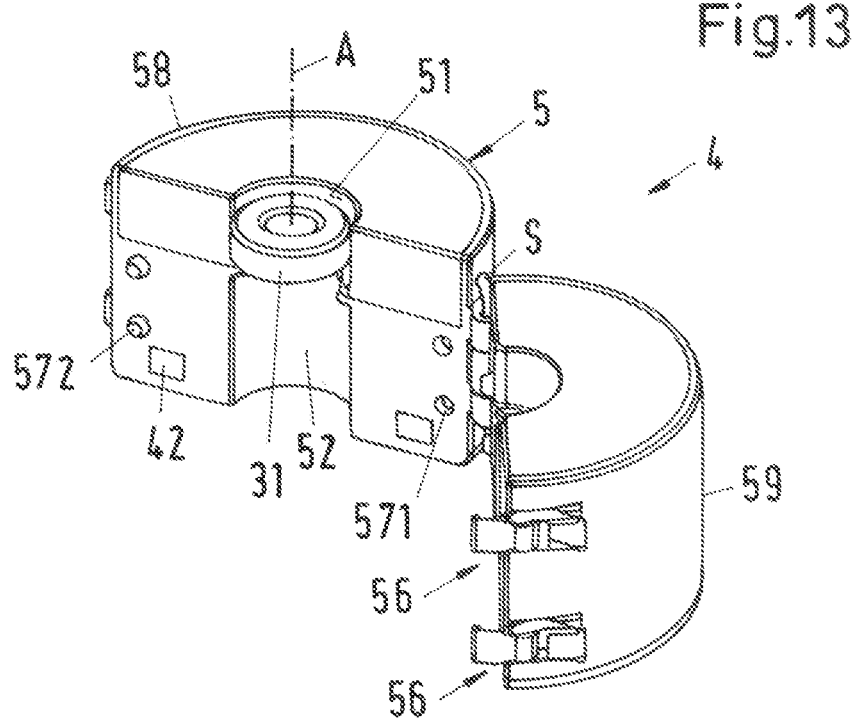
FIG. 13 illustrates a perspective representation of a variant for the embodiment of the stator housing (in the open position)

FIG. 13 shows in a perspective representation a variant for the embodiment of the stator housing 5 in the open position. This embodiment of the stator housing 5 of the stator 4 is particularly suitable for those embodiments of the stator 4 in which the stator 4 has an even number of stator poles 41 or coil cores 45. In the variant represented in FIG. 13, the first housing part 58 and the second housing part 59 are designed to be substantially the same length, viewed in the circumferential direction, so that both housing parts 58, 59 can receive and preferably encapsulate the same number of stator poles 41 or coil cores 45. The two housing parts 58 and 59 are each designed in the form of a half cylinder. Otherwise, the stator housing 5 represented in FIG. 13 is designed in the analogously same way as explained in FIG. 5 and FIG. 6.

Figure 14:
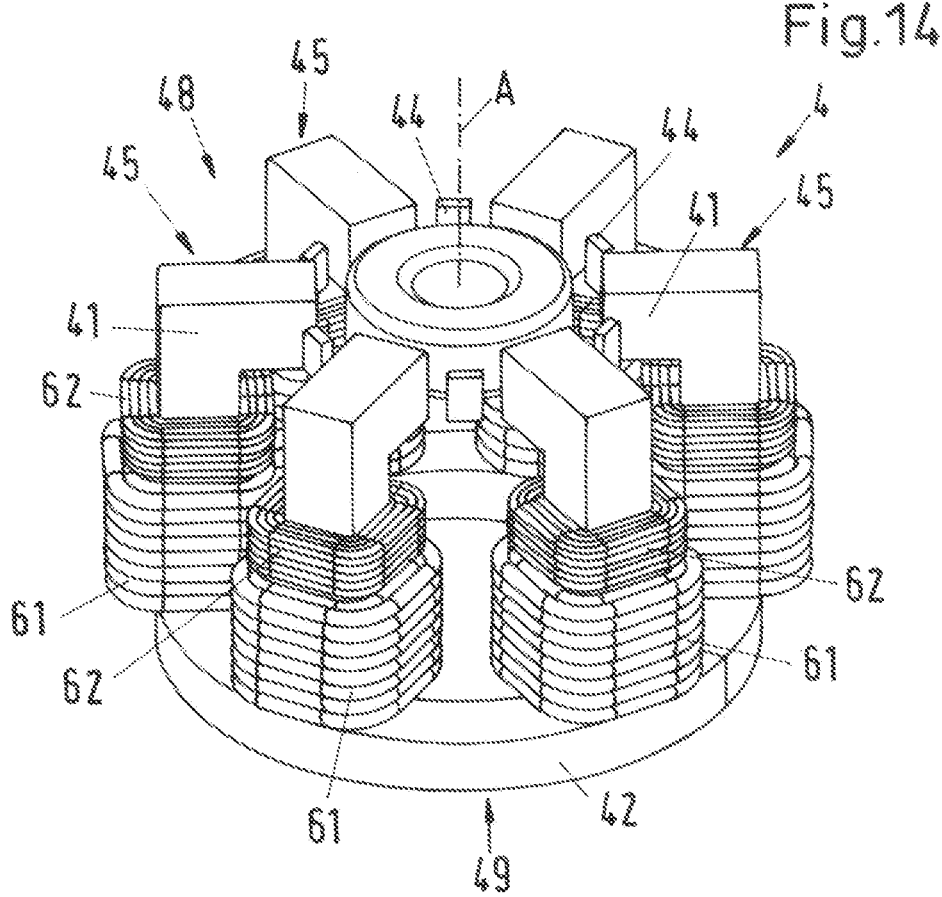
FIG. 14 illustrates a perspective representation of a second variant for the embodiment of the stator, wherein the stator is in the closed position.

FIG. 14 shows in a perspective view a second variant for the embodiment of the stator 4, wherein the stator 4 is in the closed position. This second variant is also suitable for an embodiment of the electromagnetic rotary drive 1 as a temple motor. In contrast to the first variant (FIG. 11, FIG. 12), the second variant has an even number of coil cores 45, namely six coil cores 45. In addition, two coils are provided on each coil core 45, namely one drive coil 61 and one control coil 62 in each case. The drive coils 61 serve to generate the drive field, and the control coils serve to generate the control field. In the second variant, two different winding systems are thus provided for generating the drive field and for generating the control field.

With an even number of stator poles 41 or coil cores 45, the stator 4 is preferably symmetrically divided, i.e., the first stator part 48 and the second stator part 49 comprise the same number of stator poles 41 or coil cores 45.

In the second variant, the stator 4 comprises the first stator part 48 which comprises three coil cores 45 each having a drive coil 61 arranged thereon and a control coil 62 arranged thereon, a part, namely substantially half of the reflux 42 and four position sensors 44. These components of the first stator part 48 are arranged in the first housing part 58 (see, for example, FIG. 13) and are preferably encapsulated by this first housing part 58. Furthermore, the control device 80 (not represented in FIG. 14) or parts of the control device 80 can be arranged in the first housing part 58.

The stator 4 further comprises the second stator part 49, which comprises three coil cores 45 each having a drive coil 61 arranged thereon and a control coil 62 arranged thereon, a part, namely substantially half of the reflux 42 and two position sensors 44. These components of the second stator part 49 are arranged in the second housing part 59 (see, for example, FIG. 13) and are preferably encapsulated by this second housing part 59. Furthermore, the control device 80 or parts of the control device 80 can be arranged in the second housing part 58.

Due to the same number of stator poles 41 or coil cores 45 in the first stator part 48 and in the second stator part 49, the stator housing 5 is preferably designed as represented in FIG. 13.

It is understood that in the embodiment with separate drive coils 61 and separate control coils 62, embodiments with an uneven number of stator poles 41 or coil cores 45 are also possible. In the case of the embodiments with only one winding 6 on each coil core 45 or on each stator pole 41, it is of course also possible to provide an even number of stator poles 41 or coil cores 45 (see, for example, FIG. 2). Furthermore, embodiments with an even or with an uneven number of stator poles 41 or coil cores 45 are possible, wherein the number is greater than six.

Figure 15:
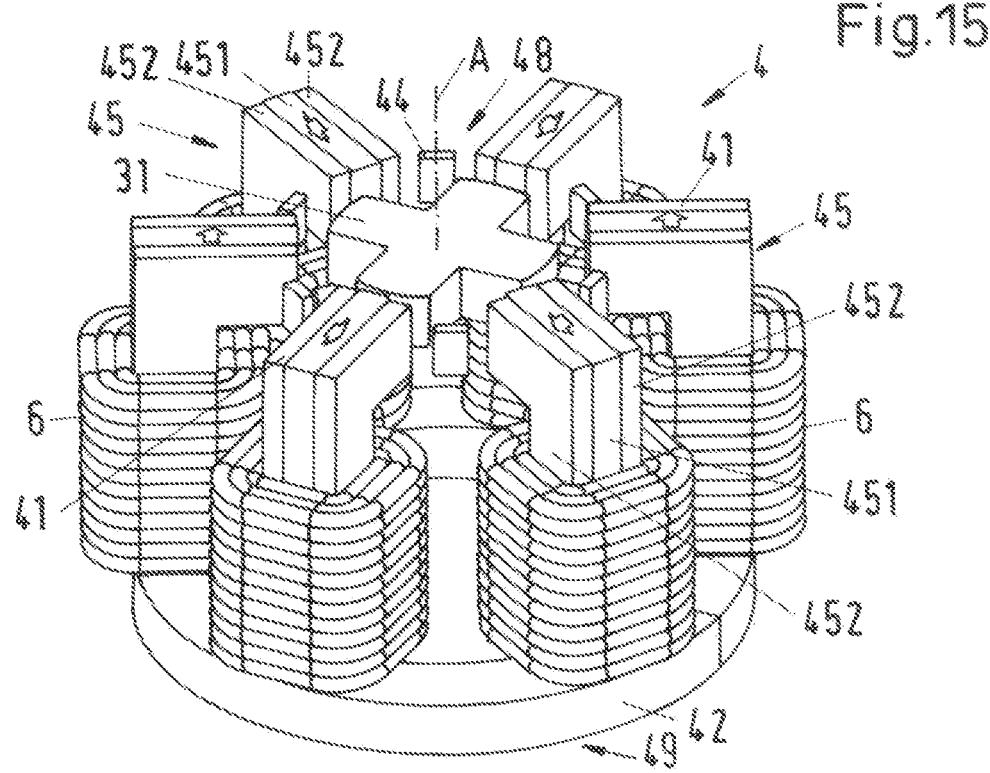
FIG. 15 illustrates a perspective representation of a third variant for the embodiment of the stator and the rotor, wherein the stator is in the closed position.
Figure 16:
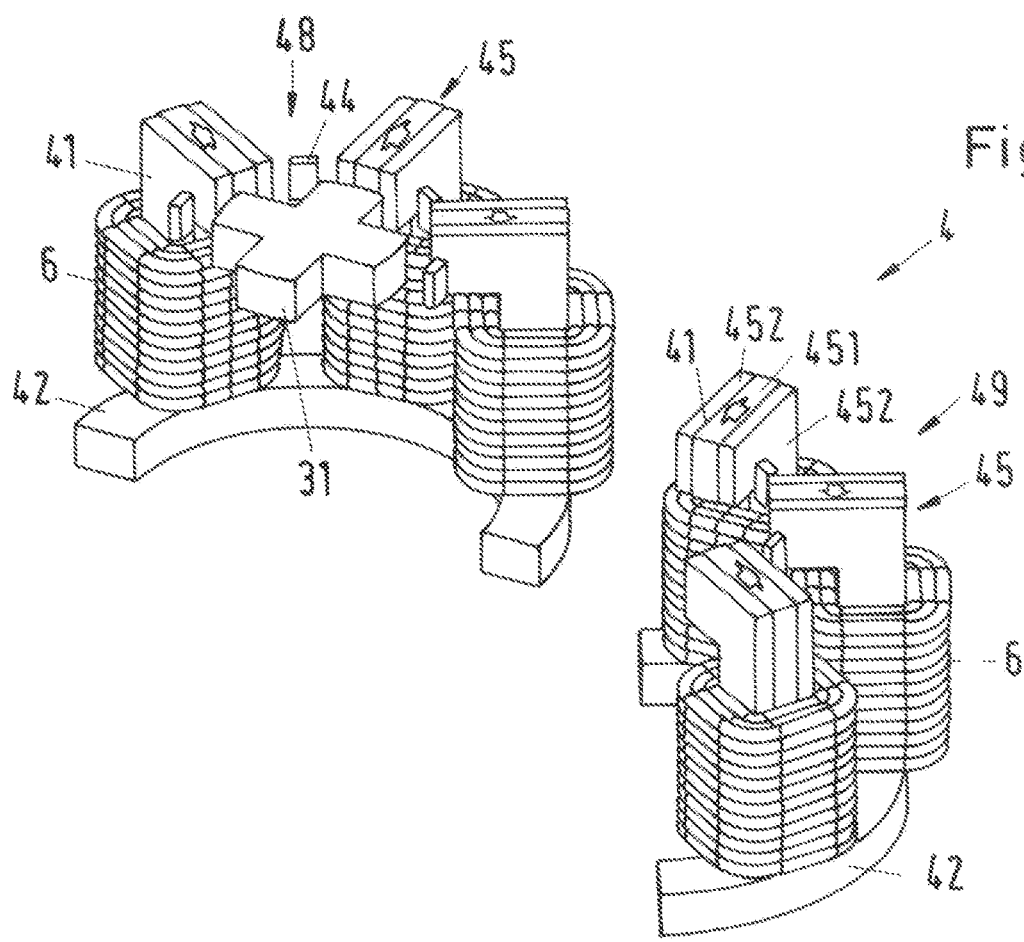
FIG. 16 illustrates a perspective representation of the third variant for the embodiment of the stator and the rotor, wherein the stator is in the open position.

FIG. 15 shows a perspective representation of a third variant for the embodiment of the stator 4 and the rotor 3, wherein the stator 4 is in the closed position. FIG. 16 shows this third variant in the open position. This third variant is also suitable for an embodiment of the electromagnetic rotary drive 1 as a temple motor. In the third variant, again—with exemplary character—six coil cores 45 are provided. Exactly one winding 6 is arranged around the longitudinal leg 46 of each coil core 45.

In the third variant, the stator 4 is designed in a permanent magnetic manner. Such a permanent magnetic design of the stator 4 is disclosed, for example, in EP 3 232 549 A1 of the same applicant.

Each coil core 45 comprises in each case a permanent magnetic part 451 which is enclosed between two permanent-magnet-free parts 452, wherein both permanent-magnet-free parts 452 and the permanent magnetic part 451 are each designed in an L-shape.

Each of the permanent-magnet-free parts 452 and each of the permanent magnetic parts 451 thus have an L-shaped design, wherein the two boundary surfaces of the two permanent-magnet-free parts 452, which are adjacent to the permanent magnetic part 451, each are designed to be congruent with the boundary surfaces of the permanent magnetic part 451 that contact them. Thus, the two permanent-magnet-free parts 452 of each coil core 45 are completely separated from each other by the respective permanent magnetic part 451 located between them.

This means that the permanent magnetic parts 451 and the two permanent-magnet-free parts 452 of each coil core 45 each also extend through the transverse leg 47, and also in the transverse leg 47 the permanent magnetic part 451 is arranged between the two permanent-magnet-free parts 452.

As shown in FIG. 15 and FIG. 16 by the arrows without reference signs in the permanent magnetic parts 451, the permanent magnetic parts 451 are each polarized or magnetized in the circumferential direction of the stator 4, i.e., each permanent magnetic part 451 has a magnetization which is oriented perpendicular to the radial direction and perpendicular to the axial direction A. The permanent magnetic parts 451 of adjacent coil cores 4 are each magnetized in the opposite direction, i.e., each permanent magnetic part 451 of a coil core 45 is surrounded, viewed in the circumferential direction, by two permanent magnetic parts 451 of adjacent coil cores 45, each of which is magnetized in the opposite direction to itself.

Due to the embodiment of the stator 4 of the temple motor, which comprises permanent magnets in the stator 4, it is possible to generate the entire magnetic flux in the stator 4. In doing so, it is possible, in particular, that the rotor 3 does not have to contribute to the generation of the magnetic flux, but only has to conduct or guide it. Thus, permanent magnets or very hard magnetic materials can be dispensed within the rotor 3 for flux generation. Since the rotor 3 is a component of the single-use device 100, it is advantageous for economic reasons and from an environmental point of view that the rotor 3 can be designed without permanent magnets.

The rotor 3 is also designed without coils. i.e., no windings are provided on the rotor 3.

Thus, the magnetically effective core 31 of the rotor can be designed without coils and without permanent magnets, for example as a reluctance rotor. Preferably, the magnetically effective core 31 of the rotor 3 is made of a soft magnetic material, for example iron, nickel-iron, cobalt-iron, silicon iron or mu-metal. In the embodiment as a reluctance rotor, the magnetically effective core 31 is designed, for example—as shown in FIG. 15 and FIG. 16—as a disk-shaped cross with four pronounced rotor teeth.

With respect to further explanations of the embodiment of the stator 4 with permanent magnets, reference is made to EP 3 232 549.

Figure 17:
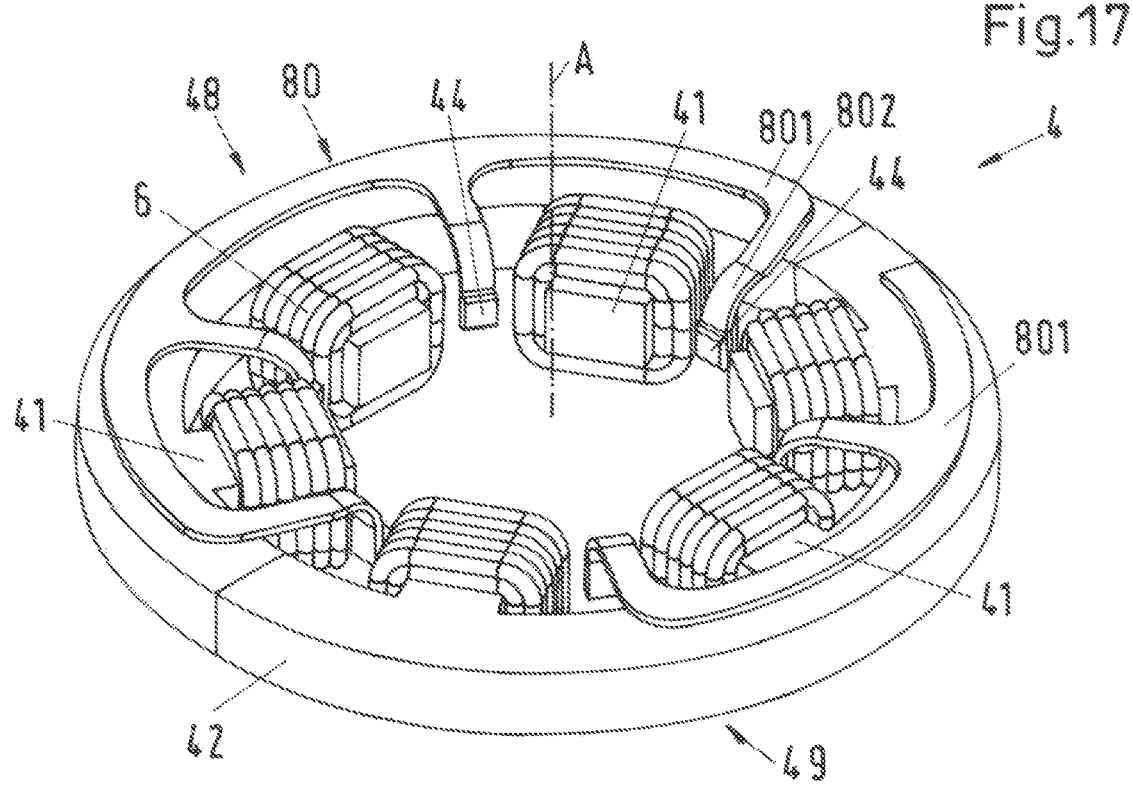
FIG. 17 illustrates a perspective representation of a fourth variant for the embodiment of the stator, wherein the stator is in the closed position, FIG. 18 a perspective representation of the fourth variant for the embodiment of the stator, wherein the stator is in the open position.

FIG. 17 shows a perspective representation of a fourth variant for the embodiment of the stator 4, wherein the stator 4 is in the closed position. FIG. 18 shows this fourth variant with the stator 4 in the open position. This fourth variant is suitable for an embodiment of the electromagnetic rotary drive 1 as a flat motor or as a radial motor.

For reasons of a better overview and because it is sufficient for understanding, the magnetically effective core 31 is not represented in FIG. 17 and FIG. 18. This can, for example, be designed in the analogously same way as described with respect to FIGS. 4A and 4B. This means that the magnetically effective core 31 is then designed as a permanent magnetic disk or as a permanent magnetic ring and diametrically magnetized.

In FIGS. 17 and 18, the stator 4 is shown for an embodiment as a flat motor, wherein the stator 4 has a total of six pronounced stator poles 41, each extending radially inward from the radially outer ring-shaped reflux 42 toward the magnetic core 31 (not represented) of the rotor 3. Each stator pole 41 is arranged in the radial plane and is each bounded by an end face facing the magnetically effective core 31 of the rotor 3. During operation of the electromagnetic rotary drive 1, the desired position is that the magnetically effective core 31 is centered between the end faces of the stator poles 41.

In order to generate the electromagnetic rotating fields necessary for the magnetic drive and the magnetic levitation of the rotor 3, the stator poles 41 carry the windings 6, which are again designed as concentrated windings 6, for example, in such a way that exactly one concentrated winding 6 is wound around each stator pole 41, so that each concentrated winding 6 is arranged in the radial plane. In the operating state, the electromagnetic rotating fields for the drive and levitation of the rotor 3 are generated with these concentrated windings 6.

In the embodiment represented here, the windings 6 are represented as combined windings. i.e., no separate drive coils and control coils are provided. Of course, such embodiments of the flat motor are also possible in which separate drive coils and separate control coils are provided, for example in the analogously same way as described with reference to FIG. 14. In the embodiment with separate drive and control coils, it is preferred that exactly one control coil and exactly one drive coil are provided on each stator pole 41.

It should be noted that the embodiment with six stator poles 41 is to be understood as exemplary. Even in the embodiment as a flat motor, for example, only five or even more than six stator poles 41 can be provided.

In the embodiment as a flat motor, the stator 4 also comprises a plurality of sensors 44, for example position sensors, which are preferably arranged in each case with respect to the circumferential direction between two adjacent stator poles 41. A total of six sensors 44 is provided, each of which is provided in each case between two stator poles 41 adjacent in the circumferential direction. All sensors 44 are signal-connected to the control device 80, which comprises the power electronics for controlling and supplying the windings 6, and the signal processing electronics.

The control device 80 comprises one or more metal blanks or PCBs (PCB: printed circuit board) 801 which are arranged on the reflux 42 or a jacket of the reflux 42, which is not represented. Each sensor 44 is connected to a PCB 801, so that signal evaluation and control of the sensors 44 can be performed in the PCBs 801. In particular, the PCBs can also be designed such that the sensors 44 are each arranged directly on a PCB 801. For this purpose, it is possible, as shown in FIG. 17 and FIG. 18, to design the respective PCB 801 with bent parts 802, for example as a flexible, i.e., bendable PCB 801. The PCBs 801 can also comprise further components, for example lines for the supply and the control of the windings 6.

With an even number of stator poles 41, the stator 4 is preferably symmetrically divided, i.e., the first stator part 48 and the second stator part 49 comprise the same number of stator poles 41. Then, the stator housing 5 is preferably designed analogously as explained with reference to FIG. 13.

In the fourth variant, the stator 4 comprises the first stator part 48, which comprises three stator poles 41 each with a winding 6 arranged thereon, a part, namely substantially half of the reflux 42, four position sensors 44, and a PCB 801 for these position sensors 44. These components of the first stator part 48 are arranged in the first housing part 58 (see, for example, FIG. 13) and are preferably encapsulated by this first housing part 58. Furthermore, other parts of the control device 80 can be arranged in the first housing part 58.

The stator 4 further comprises the second stator part 49, which comprises three stator poles 41 each with a winding 6 arranged thereon, a part, namely substantially half of the reflux 42, two position sensors 44, and a PCB 801 for these position sensors 44. These components of the second stator part 49 are arranged in the second housing part 59 (see, for example, FIG. 13) and are preferably encapsulated by this second housing part 59. Furthermore, other parts of the control device 80 can be arranged in the second housing part 58.

As can be seen in particular in FIG. 18, a recess 571 and an elevation 572 are provided in each case as mechanical centering device in the boundary surfaces of the reflux 42, i.e., where the division is between the part of the reflux 42 belonging to the first stator part 48 and the part of the reflux 42 belonging to the second stator part 49, respectively. In analogously the same way as explained with reference to FIG. 5 and FIG. 6, the recesses 571 and the elevations 572 are designed and arranged in such a way that in the closed position of the stator 4 each elevation 572 engages in each case in one of the recesses 571, preferably engages in a precisely fitting manner, and thus centers the two stator parts 48, 49 relative to each other. The recesses 571 and elevations 572 arranged in the reflux 42 can be provided alternatively or in addition to the recesses 571 and elevations 572 arranged at the stator housing 5 (see FIG. 6).

Figure 19:
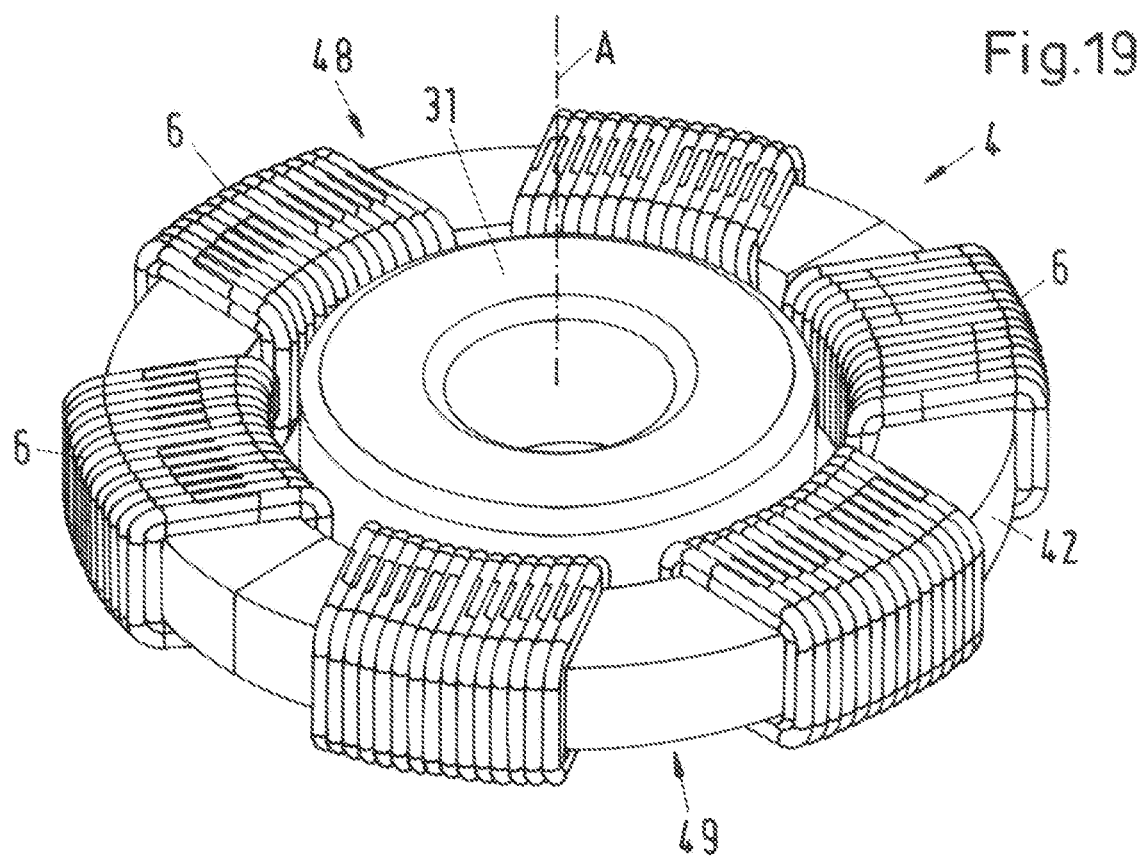
FIG. 19 illustrates a perspective representation of a fifth variant for the embodiment of the stator and the rotor, wherein the stator is in the closed position.
Figure 20:
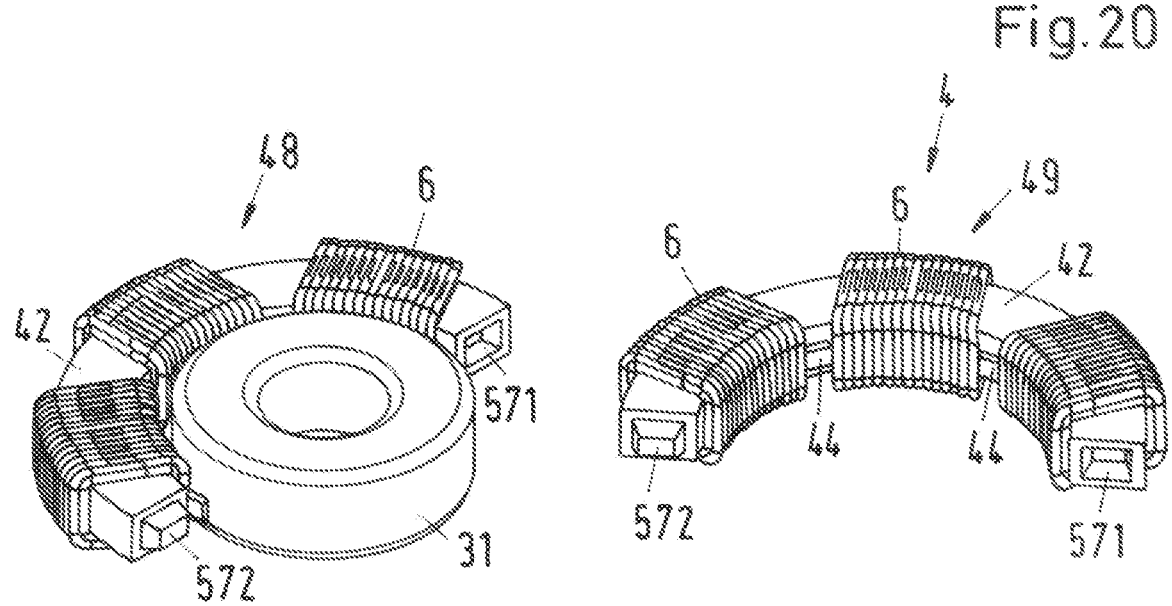
FIG. 20 illustrates a perspective representation of the fifth variant for the embodiment of the stator and the rotor, wherein the stator is in the open position.

FIG. 19 shows a perspective representation of a fifth variant for the embodiment of the stator 4 and the rotor 3, wherein the stator 4 is in the closed position. FIG. 20 shows this variant with the stator 4 in the open position. Since it is sufficient for understanding, only the magnetically effective core 31 is represented of the rotor 3. Furthermore, the sensors 44 and the control device 80 are not represented.

The fifth variant is suitable for the embodiment of the electromagnetic rotary drive 1 as a flat motor. The magnetically effective core 31 is again designed as a permanent magnetic disk or as a permanent magnetic ring and is preferably diametrically magnetized.

A significant difference from the fourth variant is that the fifth variant is designed for a grooveless electromagnetic rotary drive 1. No pronounced stator poles 41 or coil cores 45 are provided, but the windings 6 are each designed as toroidal coils wound around the reflux 42. In the closed position of the stator (FIG. 20), the stator 4 is substantially ring-shaped.

A total of six windings 6 is provided, which are arranged equidistantly with respect to the circumferential direction on the ring-shaped reflux 42 and surround the radially inner magnetic core 31. Designs with fewer than six, for example five, or with more than six windings 6 are of course also possible.

In the embodiment represented here, the windings 6 are represented as combined windings. i.e., no separate drive coils and control coils are provided. Of course, such embodiments of the grooveless motor are also possible in which separate drive coils and separate control coils are provided. These are then wound on top of each other, for example.

In the embodiment with six windings 6 or more generally with an even number of windings 6, the stator 4 is preferably symmetrically divided so that the first stator part 48 comprises the same number of windings 6 as the second stator part 49.

The embodiment of the electromagnetic rotary drive 1 as a grooveless motor is particularly suitable for applications where high rotational speeds of the rotor 3 are required or where the lowest possible losses are important.

Figure 21:
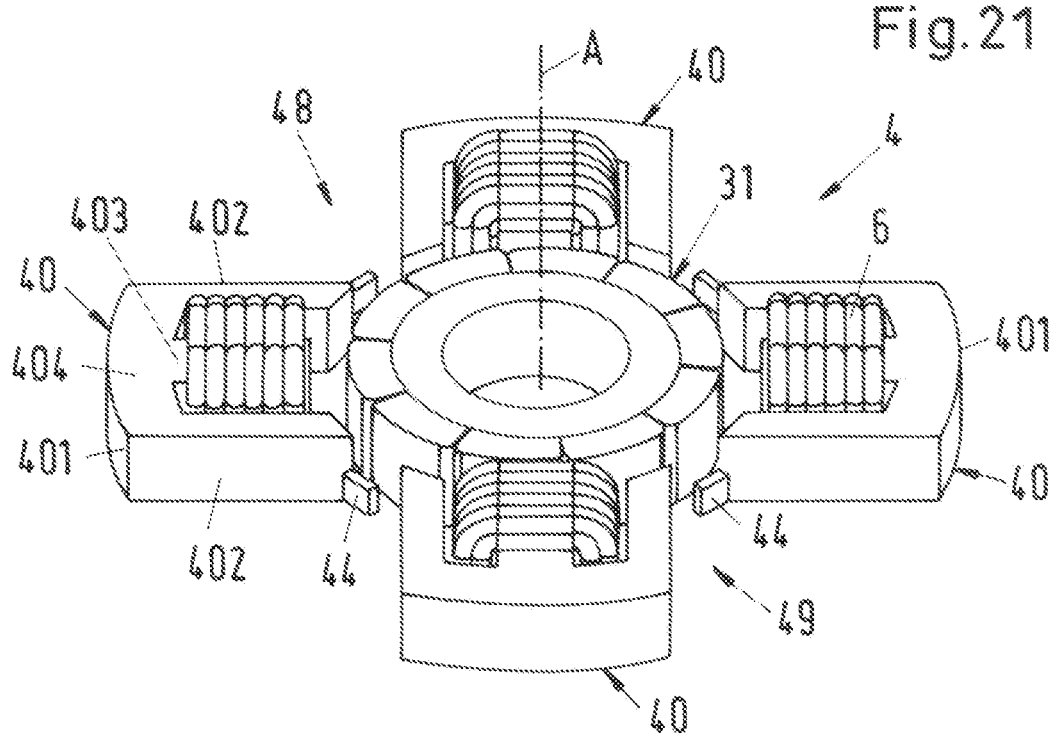
FIG. 21 illustrates a perspective representation of a sixth variant for the embodiment of the stator and the rotor, where the stator is in the closed position.
Figure 22:
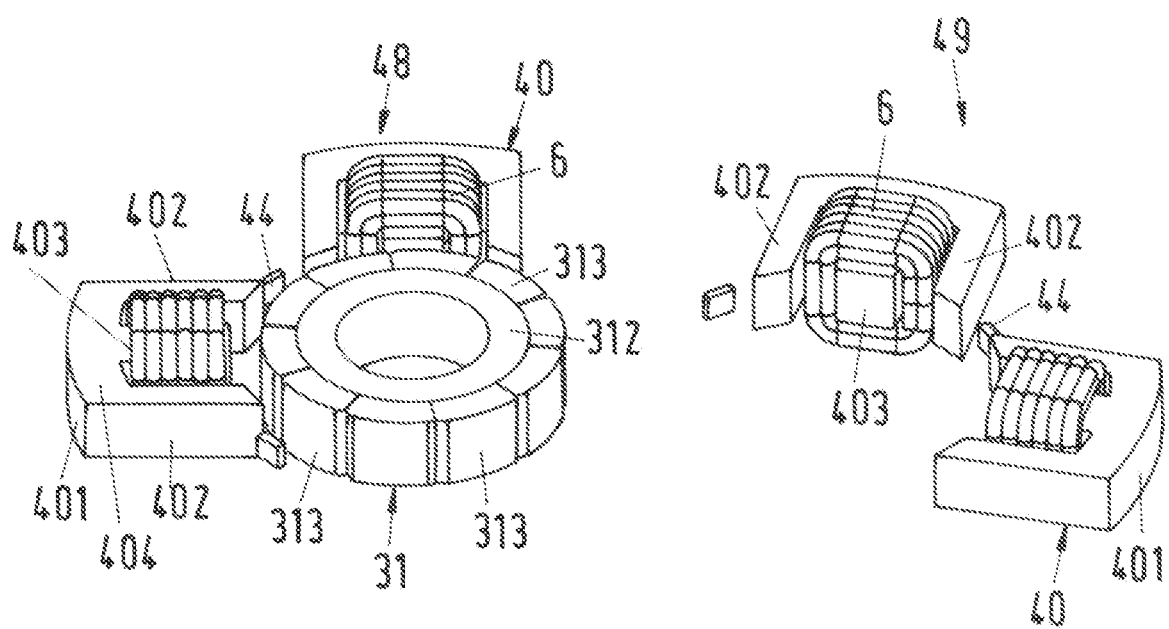
FIG. 22 illustrates a perspective representation of the sixth variant for the embodiment of the stator and the rotor, where the stator is in the open position.

FIG. 21 shows a perspective representation of a sixth variant for the embodiment of the stator 4 and the rotor 3, wherein the stator 4 is in the closed position. FIG. 22 shows the sixth variant with the stator 4 in the open position.

The sixth variant is suitable for an embodiment of the electromagnetic rotary drive 1 as a flat motor. Especially, the sixth variant is suitable for an embodiment of the electric rotary drive 1 as a segment motor.

The stator 4 comprises a plurality—here with exemplary character four—of stator segments 40, which are arranged equidistantly with respect to the circumferential direction around the radially inner magnetic core 31 of the rotor 3. The individual stator segments 40 are not directly magnetically connected to each other. Thus, there is no direct magnetic connection between the stator segments 40 as realized, for example, in the variants described above by the reflux 42.

Each stator segment 40 comprises a segment core 401, which is substantially designed in an E-shape, with two outer legs 402 and a central leg 403, which is arranged between the two outer legs 402 with respect to the circumferential direction. Furthermore, a ring-segment-shaped base 404 is provided, which connects the radially outer ends of the two outer legs 402 and the central leg 403 to each other. The two outer legs 402 and the central leg 403 thus extend in each case from the base 404 in the radial direction towards the radially inner magnetically effective core 31 of the rotor 3. In the analogously same way as explained above for the reflux 42, each segment core 401 is made of a soft magnetic material, whereby a design as a laminate stack is preferred.

Exactly one winding 6 is arranged in each case on the central leg 403, so that the stator 4 has a total of four windings 6. The windings 6 are designed as combined windings, i.e., no separate drive coils and control coils are provided.

As already mentioned, the stator segments 40 are not directly connected magnetically to one another. In each stator segment 40, the magnetic flux generated by the winding is guided into the magnetically effective core 31 via the central leg 403 and returned to the stator segment 40 via the two outer legs 402 or vice versa.

The ring-shaped designed magnetically effective core 31 comprises a radially inner ring-shaped rotor reflux 312 made of a soft magnetic material and a plurality of permanent magnets 313, in this case ten permanent magnets 313, arranged radially outwardly along the circumference of the rotor reflux 312 on the rotor reflux 313.

In the embodiment with four stator segments 40, or more generally with an even number of stator segments 40, the stator 4 is preferably designed such that the first stator part 48 comprises the same number of stator segments 40 as the second stator part 49.

Figure 23:
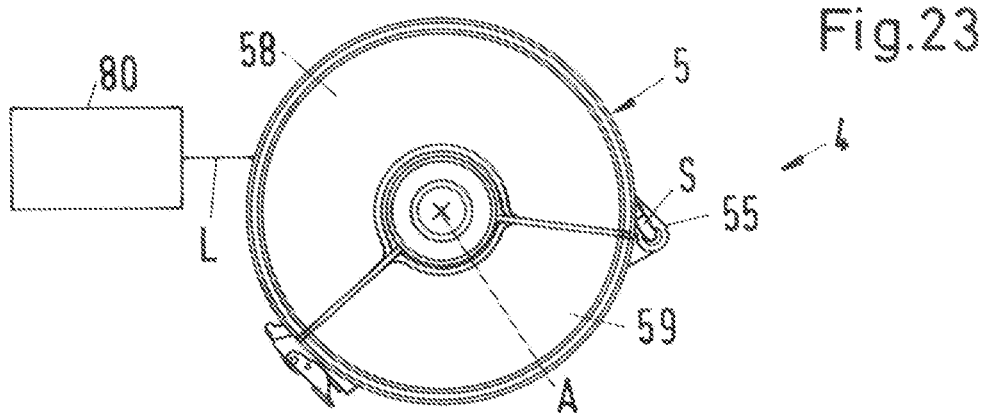
FIGS. 23-25 illustrate different variants for the embodiment of the control device, each in a schematic representation.
Figure 24:
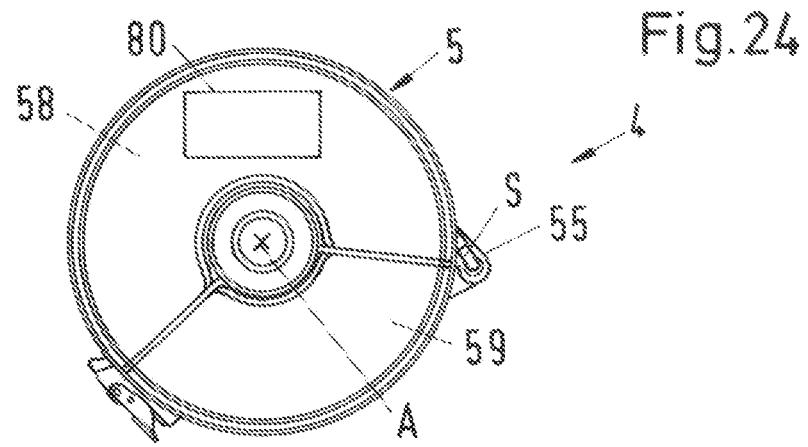
Figure 25:
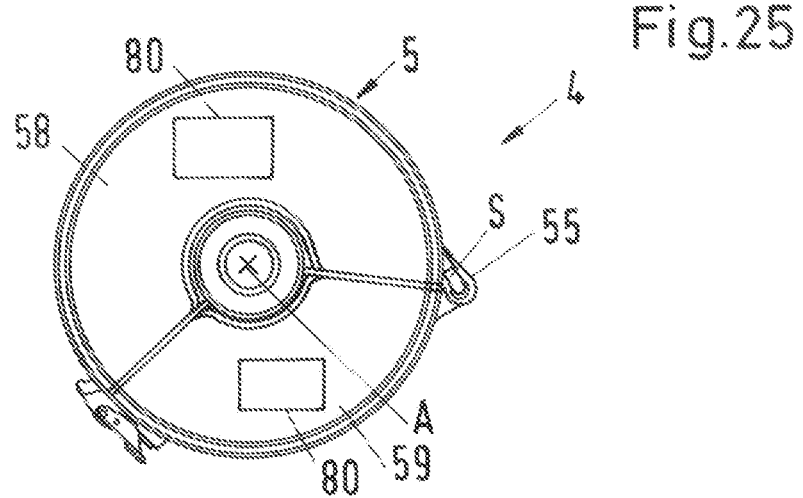

With reference to FIG. 23 to 25, various variants for the embodiment of the control device 80 are now explained. FIG. 23 to FIG. 25 each show schematic representations.

The control device 80 comprises the control, regulation and actuation devices required for the operation of the electromagnetic rotary drive 1, i.e., in particular the power electronics for controlling and supplying the windings 6, 61, 62. The currents for generating the electromagnetic rotating fields are generated in the windings 6, 61, 62 with the power electronics. Furthermore, the control device 80 comprises the signal processing electronics with which the sensors 44 are controlled and the signals transmitted by the sensors 44 are evaluated. The control device 80 also performs regulation functions, for example the active magnetic regulation of the radial position of the magnetically effective core 31 of the rotor 3 in the radial plane. As already mentioned, at least parts of the control device can be designed as PCBs, for example as the PCBs 801 explained in connection with FIG. 17 and FIG. 18.

FIG. 23 shows a variant in which the entire control device 80 is arranged outside the stator housing 5 and is connected via an electrical line L to the stator housing 5 or to the components of the stator 4 arranged therein.

FIG. 24 shows a variant in which the control device 80 is arranged in one of the two housing parts 58, 59, here in the first housing part 58. The connection of the control device 80 to the second stator part 49 arranged in the second housing part 59 is then made, for example, via the electrical connection S, which is passed through the joint 55.

FIG. 25 shows a variant in which the control device 80 is distributed over the two housing parts 58, 59. Here it is possible, for example, that the entire power electronics of the control device 80 are arranged in one of the two housing parts 58, 59, and the electronics for the signal processing are distributed over the two housing parts 58, 59. However, it is also possible that both the power electronics of the control device 80 and the electronics for signal processing are distributed over the two housing parts 58, 59.

For the electromagnetic rotary drive 1 according to the disclosure, which comprises the single-use device 100 and the reusable device 200, it is further an important aspect that the single-use device 100, which is preferably assembled as a pre-assembled unit, must be sterilizable for some applications. In this regard, it is particularly advantageous if the single-use device 100 is gamma-sterilizable. In this type of sterilization, the element to be sterilized is applied with gamma radiation. The advantage of gamma sterilization, for example in comparison with steam sterilization, is in particular that sterilization can also take place through the package. For single-use devices in particular, it is a common practice that the parts are placed in the package after they are manufactured and then stored for a period of time before being shipped to the customer. Sterilization then usually takes place shortly before delivery to the customer or only by the customer. In such cases, sterilization takes place through the package, which is not possible with steam sterilization or other processes.

With regard to the single-use device 100, it is generally not necessary for them to be sterilizable more than once. This is a great advantage, particularly in the case of gamma sterilization, because the application of gamma radiation to plastics can lead to degradation, so that multiple gamma sterilization can render the plastic unusable.

Since sterilization under high temperatures and/or under high (steam) pressure can usually be dispensed with for single-use devices 100, less expensive plastics can be used, for example those that cannot withstand high temperatures or that cannot be subjected to multiple high temperature and pressure levels.

Considering all these aspects, it is therefore preferred to use such plastics that can be gamma-sterilized at least once for the manufacture of the single-use device 100. The materials should be gamma-stable for a dose of at least 40 kGy to enable a single gamma sterilization. In addition, no toxic substances should be generated during gamma sterilization. In addition, it is preferred that all materials that come into contact with the substances to be mixed or the intermixed substances meet USP Class VI standards.

For manufacturing the single-use device 100, the following plastics are suitable, for example: polyvinyl chloride (PVC), polypropylene (PP), polyethylene (PE), low density polyethylene (LDPE), ultra low density polyethylene (ULDPE), high density polyethylene (HDPE), ethylene vinyl acetate (EVA), polyethylene terephthalate (PET), polyvinylidene fluoride (PVDF), acrylonitrile butadiene styrene (ABS), polyacryl, polycarbonate (PC), polysulfones such as polysulfone (PSU).

The connecting tube 9 or the connecting tubes 9, respectively, and at least a part of the connections 103 are preferably realized with pipes which are designed as flexible pipes, i.e., pipes whose wall can be deformed. Each pipe is designed, for example, as a plastic tube consisting, for example, of a silicone rubber, PVC (polyvinyl chloride), PU (polyurethane), PE (polyethylene), HDPE (high-density polyethylene), PP (polypropylene), EVA (ethyl vinyl acetate) or nylon.

The invention claimed is:

1. An electromagnetic rotary drive comprising:
a single-use device configured for single use; and
a reusable device configured for multiple use,
the single-use device comprising a rotor housing with a rotor, a connecting tube for a fluid, and a single-use component, the rotor housing having an inlet and an outlet, the rotor disposed in the rotor housing to rotate about a desired axis of rotation defining an axial direction, the rotor configured to be magnetically driven without contact, and the connecting tube connecting the inlet or the outlet of the rotor housing to the single-use component such that in an operating state the fluid flows through the connecting tube, the reusable device comprising a stator, by which the rotor is configured to be magnetically driven without contact to rotate about the desired axis of rotation in the operating state, the stator comprising a plurality of windings configured to generate an electromagnetic rotating field to drive the rotor, and the stator having a stator housing with a feedthrough for the connecting tube, the stator openably designed with a first stator part and a second stator part configured to be moved relative to each other, in an open position of the stator, the connecting tube capable of being inserted into the feedthrough, and in a closed position of the stator the feedthrough enclosing the connecting tube.

2. The electromagnetic rotary drive according to claim 1, wherein the first stator part and the second stator part are connected to each other by a joint.

3. The electromagnetic rotary drive according to claim 2, wherein an electrical connection passes through the joint.

4. The electromagnetic rotary drive according to claim 1, wherein a mechanical fixing device is provided at the stator housing, with which the first stator part is detachably fixed to the second stator part in the closed position.

5. The electromagnetic rotary drive according to claim 1, wherein a mechanical centering device is provided which centers the first stator part relative to the second stator part in the closed position of the stator.

6. The electromagnetic rotary drive according to claim 1, wherein the stator housing is substantially cylindrically, and the first stator part is longer than the second stator part, viewed in the circumferential direction.

7. The electromagnetic rotary drive according to claim 1, wherein at least one winding is provided in each of the first and second stator parts, and the number of windings in the first stator part is different from the number of windings in the second stator part.

8. The electromagnetic rotary drive according to claim 1, wherein the stator is a bearing and drive stator, with which the rotor is capable of being magnetically levitated without contact with respect to the stator in the operating state.

9. The electromagnetic rotary drive according to claim 1, in which the rotor comprises a magnetically effective core, and the stator has a plurality of stator poles which are arranged around the magnetically effective core, and each of the stator poles is bounded by an end face facing the magnetically effective core of the rotor.

10. The electromagnetic rotary drive according to claim 9, wherein the electromagnetic rotary drive is a temple motor, the stator has a plurality of coil cores, each of which comprises a rod-shaped longitudinal leg which extends from a first end in the axial direction to a second end, and a transverse leg which is arranged at the second end of the longitudinal leg and which extends in a radial direction perpendicular to the axial direction, each transverse leg forming one of the plurality of stator poles, and at least one concentrated winding is arranged at and surrounds each longitudinal leg.

11. The electromagnetic rotary drive according to claim 1, wherein the rotor extends in the axial direction from a first end to a second end, a magnetically effective core is provided at each of the first and second ends, and the stator is a first stator and the electromagnetic rotary drive includes a second stator, the first and second stators are arranged spaced apart with respect to the axial direction, each of the first and second stators is arranged and designed to cooperate with exactly one of the magnetically effective cores such that the rotor is magnetically levitated without contact with respect to the stators in the operating state.

12. The electromagnetic rotary drive according to claim 11, further comprising a controller arranged at or in the first or the second stator part.

13. A single-use device for an electromagnetic rotary drive, comprising:
   a rotor housing with the rotor;
   a single-use component; and
   a connecting tube,
   the rotor housing having an inlet and an outlet, the rotor disposed in the rotor housing to rotate about a desired axis of rotation defining an axial direction, the rotor configured to be magnetically driven without contact, and the connecting tube connecting the inlet or the outlet of the rotor housing to the single-use component such that in an operating state fluid flows through the connecting tube, the rotor configured to be magnetically driven without contact to rotate about a desired axis of rotation in the operating state by a stator comprising a plurality of windings configured to generate an electromagnetic rotating field to drive the rotor, and having a stator housing with a feedthrough for the connecting tube, the stator openably designed with a first stator part and a second stator part configured to be moved relative to each other, in an open position of the stator, the connecting tube capable of being inserted into the feedthrough, and in a closed position of the stator the feedthrough enclosing the connecting tube.

14. The single-use device according to claim 13, wherein the single-use device is configured to be assembled into a pre-assembled unit configured to be entirely inserted into a reusable device.

15. The single-use device according to claim 13, which is enclosed sterilized in a package.

* * * * *